(12) United States Patent  
Beran

(10) Patent No.: US 10,521,077 B1  
(45) Date of Patent: Dec. 31, 2019

(54) VISUAL ANALYSIS OF A DATASET USING LINKED INTERACTIVE DATA VISUALIZATIONS

(71) Applicant: Tableau Software, Inc., Seattle, WA (US)

(72) Inventor: Bora Beran, Bothell, WA (US)

(73) Assignee: Tableau Software, Inc., Seattle, WA (US)

( * ) Notice: Subject to any disclaimer, the term of this patent is extended or adjusted under 35 U.S.C. 154(b) by 418 days.

(21) Appl. No.: 14/996,140

(22) Filed: Jan. 14, 2016

(51) Int. Cl.
*G06F 3/0482* (2013.01)
*G06F 3/0486* (2013.01)
*G06F 3/0484* (2013.01)

(52) U.S. Cl.
CPC .......... *G06F 3/0482* (2013.01); *G06F 3/0486* (2013.01); *G06F 3/04842* (2013.01)

(58) Field of Classification Search
CPC .. G06F 3/0482; G06F 3/04842; G06F 3/0486; G06T 11/206
See application file for complete search history.

(56) References Cited

U.S. PATENT DOCUMENTS

| | | | |
|---|---|---|---|
| 5,727,161 A | 3/1998 | Purcell, Jr. | |
| 5,894,311 A | 4/1999 | Jackson | |
| 6,057,844 A | 5/2000 | Strauss | |
| 6,222,540 B1 | 4/2001 | Sacerdoti | |
| 6,411,313 B1* | 6/2002 | Conlon | G06F 3/0486 715/202 |
| 7,072,863 B1* | 7/2006 | Phillips | G06Q 40/00 703/2 |
| 7,457,785 B1 | 11/2008 | Greitzer et al. | |
| 8,006,187 B1* | 8/2011 | Bailey | G06Q 30/02 715/733 |
| 9,348,881 B1* | 5/2016 | Hao | G06Q 10/10 |

(Continued)

FOREIGN PATENT DOCUMENTS

| | | |
|---|---|---|
| EP | 2098966 A1 | 8/2008 |
| WO | WO 97/06492 A1 | 2/1997 |

OTHER PUBLICATIONS

"2-D Line Plot," by MATLAB on Feb. 17, 2014, from http://www.mathworks.com/help/matlab/ref/plot.html, 8 pgs.

(Continued)

*Primary Examiner* — Nicholas Klicos
(74) *Attorney, Agent, or Firm* — Morgan, Lewis & Bockius LLP

(57) ABSTRACT

Systems and methods for dynamically analyzing data in data visualizations are disclosed herein. The method displays a first data visualization based on a first plurality of data fields and a second data visualization based on a second plurality of data fields concurrently on the display. The method forms a mathematical model to represent a functional relationship between a first field of the first data fields and a second field of the second data fields. The method receives a user input on a displayed graphical mark at a first location corresponding to an actual value in the first data visualization, thereby moving the graphical mark to a second location corresponding to a hypothetical value. The method also adjusts a displayed location of a corresponding second graphical mark in the second data visualization using an adjusted value for the second field computed using the hypothetical value as input to the mathematical model.

20 Claims, 29 Drawing Sheets

(56) References Cited

U.S. PATENT DOCUMENTS

| | | | |
|---|---|---|---|
| 2005/0004911 A1* | 1/2005 | Goldberg | G06F 17/30398 |
| 2005/0039170 A1 | 2/2005 | Cifra et al. | |
| 2007/0067211 A1* | 3/2007 | Kaplan | G06Q 10/04 |
| | | | 705/7.31 |
| 2007/0250523 A1* | 10/2007 | Beers | G06F 17/30554 |
| 2008/0189634 A1* | 8/2008 | Tevanian | G06Q 30/02 |
| | | | 715/764 |
| 2009/0076974 A1* | 3/2009 | Berg | G06Q 30/06 |
| | | | 705/36 R |
| 2009/0210430 A1* | 8/2009 | Averbuch | G06F 17/30592 |
| 2009/0252436 A1 | 10/2009 | Eidenson et al. | |
| 2009/0292190 A1 | 11/2009 | Miyashita | |
| 2010/0119053 A1* | 5/2010 | Goeldi | G06Q 10/00 |
| | | | 379/265.09 |
| 2010/0122194 A1 | 5/2010 | Rogers | |
| 2010/0235771 A1* | 9/2010 | Gregg | G06T 11/206 |
| | | | 715/769 |
| 2010/0238174 A1* | 9/2010 | Haub | G06F 3/04812 |
| | | | 345/440 |
| 2010/0315431 A1 | 12/2010 | Smith et al. | |
| 2011/0087954 A1* | 4/2011 | Dickerman | G06F 17/246 |
| | | | 715/219 |
| 2011/0087985 A1* | 4/2011 | Buchanan | G06F 3/04847 |
| | | | 715/771 |
| 2011/0115814 A1* | 5/2011 | Heimendinger | G06F 3/04883 |
| | | | 345/619 |
| 2011/0153508 A1* | 6/2011 | Jhunjhunwala | G06Q 30/02 |
| | | | 705/306 |
| 2011/0239165 A1 | 9/2011 | Peebler | |
| 2012/0023429 A1 | 1/2012 | Medhi | |
| 2012/0167006 A1* | 6/2012 | Tillert | G06F 17/30398 |
| | | | 715/810 |
| 2013/0300743 A1 | 11/2013 | Degrell et al. | |
| 2014/0075380 A1 | 3/2014 | Milirud et al. | |
| 2014/0267287 A1* | 9/2014 | Dodgen | G06T 11/206 |
| | | | 345/440 |
| 2015/0029194 A1 | 1/2015 | Ruble | |
| 2015/0074541 A1* | 3/2015 | Schwartz | G06F 9/44 |
| | | | 715/740 |
| 2015/0213631 A1* | 7/2015 | Vander Broek | G06T 11/206 |
| | | | 345/589 |
| 2015/0356705 A1* | 12/2015 | Aboumrad | G06T 3/40 |
| | | | 345/660 |
| 2016/0041944 A1* | 2/2016 | Karoji | G06F 15/0225 |
| | | | 345/440 |
| 2016/0098176 A1* | 4/2016 | Cervelli | G06F 3/04842 |
| | | | 715/804 |
| 2017/0139894 A1* | 5/2017 | Welch | G06F 17/246 |

OTHER PUBLICATIONS

"Change the display on a 3-D chart," by Microsoft Office in 2007, from https://support.office.com/en-us/article/Change-the-display-of-a-3-D-chart-60c13909-d2a1-4e06-8b8c-bccba7868c9b, 6 pgs.

FutureSource, Verson 3.7, Release Date: Dec. 13, 2013, "Drag and Drop Studies to Quotes," from http://download.esignal.com/products/workstation/help/quotes/studies/drag_drop_study.htm, Webpage tutorial for software including current (at the time of the first Office Action) version 3.7, 13 pgs.

EasyBI, easyBI Documentation, Getting Started, Create Reports, https://docs.eazybi.com/display/EAZYBI/Create+reports, downloaded Mar. 10, 2016, 1 pg.

Demo this Wednesday: Drag-and-drop to create R-based workflows, Office Supply Retail Chain Case Study: http://blog.revolutionanalytics.com/2014/01/demo-this-wednesday-drag-and-drop-to-create-r-based-workflows.html, Jan. 24, 2014, 2 pgs.

Thompson, Data Driven Journalism, Hate Spreadsheets Formulas? Meet Drag and Drop Data Analysis Tool 'Query Tree', http://datadrivenjournalism.net/resources/Hate_Spreadsheets_Formulas_Meet_Drag_and_Drop_Data_Tool_QueryTree, Jun. 14, 2013, 3 pgs.

The Tools, D4 Software Ltd, http://querytreeapp.com/help/tools/, downloaded Mar. 10, 2016, 4 pgs.

Harris, Gigaom, Data for dummies: 6 data-analysis tools anyone can use, http://gigaom.com/2013/01/31/data-for-dummies-5-data-analysis-tools-anyone-can-use/, Jan. 31, 2013, 11 pgs.

Martinez, Tableau Public, What the Tableau Public Community is Making, http://www.tableausoftware.com/public/, downloaded Mar. 10, 2016, 6 pgs.

Sisense, Business Analytics Software Built for Complex Data, http://www.sisense.com/features/, 2016, 15 pgs.

Lurie, Profit Bricks, The IaaS-Company, 39 Data Visualization Took for Big Data, http://blog.profitbricks.com/39-data-visualizations-tools-for-big-data/. Feb. 13, 2014, 37 pgs.

"Keynote—Tableau Conference 2014—theCUBE," Sep. 10, 2014, retrieved from https://www.youtube.com/watch?v=bZKq1jFm2dU, 1 pg.

Kim, Office Action, U.S. Appl. No. 14/628,170, dated Jun. 9, 2016, 25 pgs.

Kim, Office Action, U.S. Appl. No. 14/628,187, dated Jan. 9, 2017, 22 pgs.

Tableau Software, Inc., International Search Report and Written Opinion, PCTUS2015/048991, dated Feb. 25, 2016, 22 pgs.

Microsoft, "Create a Box Plot," Applied to Excel, Date: year 2013, 11 pgs.

ExcelFunctions.net, "Excel Statistical Functions," Published Feb. 17, 2012, 4 pgs.

Kim, Final Office Action, U.S. Appl. No. 14/628,170, dated Jan. 23, 2017, 33 pgs.

Kim, Final Office Action, U.S. Appl. No. 14/628,176, dated Mar. 10, 2017, 14 pgs.

Kim, Office Action, U.S. Appl. No. 14/628,181, dated May 30, 2017, 25 pgs.

Tableau Software, Inc., International Preliminary Report on Patentability PCTUS2015/048991, dated Mar. 14, 2017, 17 pgs.

Tableau Software, Inc., Communication Pursuant to Rules 161(1) and 162-EP15778078.4, dated Apr. 24, 2017, 2 pgs.

Kim, Office Action, U.S. Appl. No. 14/628,170, dated Jul. 10, 2017, 31 pgs.

Kim, Final Office Action, U.S. Appl. No. 14/628,170, dated Nov. 17, 2017, 34 pgs.

Kim, Final Office Action, U.S. Appl. No. 14/628,176, dated Aug. 23, 2017, 17 pgs.

Kim, Office Action, U.S. Appl. No. 14/628,176, dated Feb. 26, 2018, 21 pgs.

Kim, Final Office Action, U.S. Appl. No. 14/628,187, dated Jun. 29, 2017, 26 pgs.

Mathematica Beta—Stack Exchange. "How can I make an X-Y scatter-plot-with-histograms-next-to-the X-Y axes?" Mathematica, Jun. 12, 2012 [retrieved on Nov. 3, 2017]. Retrieved from the Internet: <URL: https://mathematica.stackexchange.com/questions/2984/how-can-i-make-an-x-y-scatter-plot-with-histograms-next-to-the-x-y- axes>, 8 pgs.

MATLAB Documentation. "Interacting with Graphed Data—MATLAB & Simulink". MathWorks, Feb. 15, 2013 [retrieved on Nov. 1, 2017]. Retrieved from the Internet: <URL: https://www.mathworks.com/help/matlab/data_analysis/interacting-with-graphed- data.html>, 10 pgs.

Tableau Software, Inc., Examination Report No. 1, AU2015315277, dated Jan. 8, 2018, 2 pgs.

Kim, Office Action, U.S. Appl. No. 14/628,170, dated Apr. 19, 2018, 32 pgs.

Kim, Office Action, U.S. Appl. No. 14/628,181, dated May 4, 2018, 36 pgs.

Kim, Office Action, U.S. Appl. No. 14/628,187, dated Jan. 12, 2018, 38 pgs.

Kim, Final Office Action, U.S. Appl. No. 14/628,187, dated Jun. 7, 2018, 38 pgs.

Rafi, "Glossy medical pills PSD template," published: May 24, 2011, graphicsfuel.com, from https://www.graphicsfuel.com/2011/05/glossy-medical-pills-psd-template/, 5 pgs.

\* cited by examiner

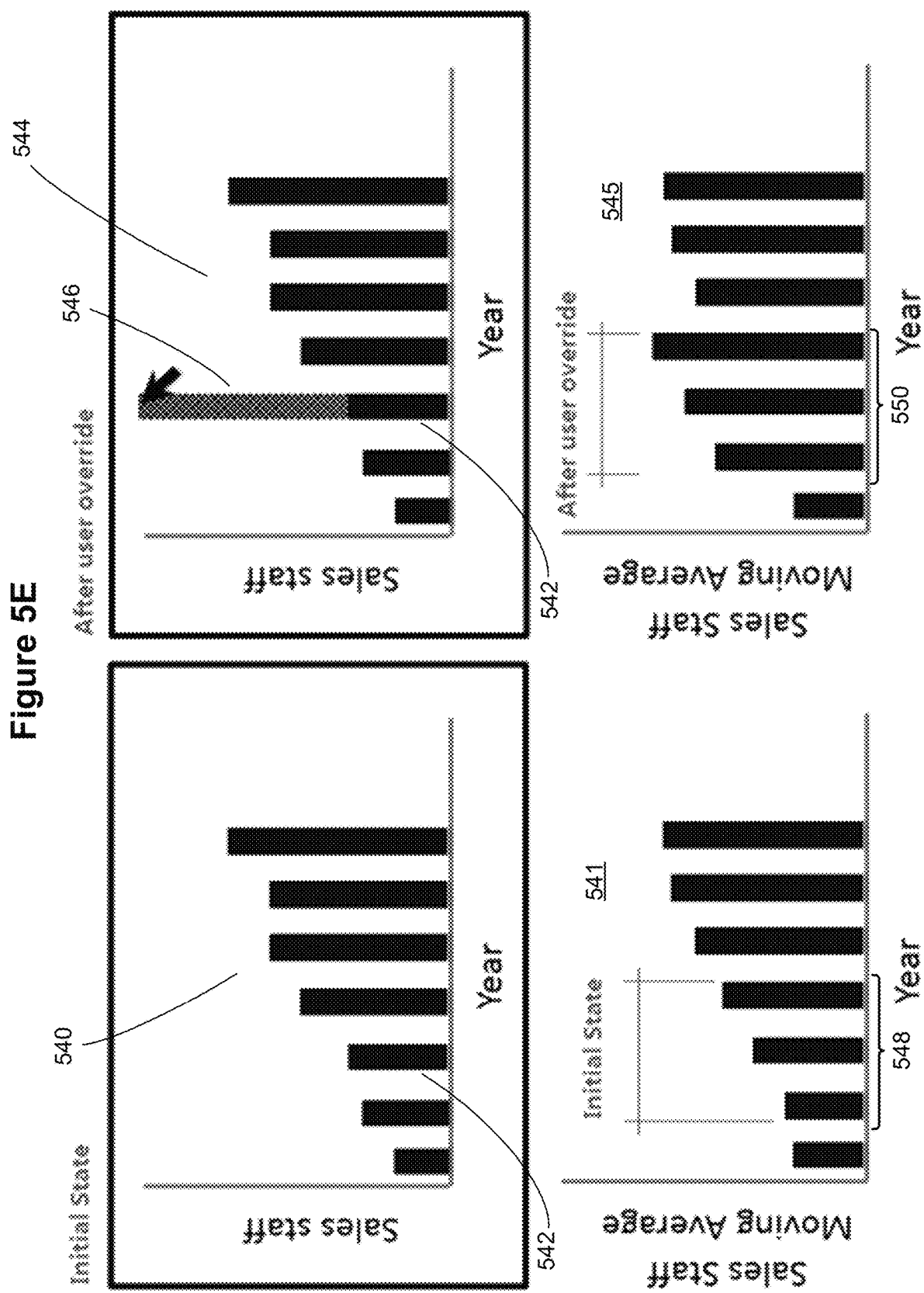

612 — A method dynamically analyzes data in a data visualization dashboard.

614 — The method is performed at a computer having a display, one or more processors, and memory.

616 — The memory stores one or more programs configured for execution by the one or more processors.

618 — Display a first data visualization and a second data visualization concurrently on the display.

620 — The first data visualization is based on a first plurality of data fields from a data source.

622 — The second data visualization is based on a second plurality of data fields from the data source.

624 — The first plurality of data fields and the second plurality of data fields share a time data field, and the first and second data visualizations have time axes corresponding to the time data field.

626 — The first and second data visualizations display graphical marks representing values of the data fields in the first plurality and the second plurality.

628 — The first data visualization and second data visualization have view types selected from among: bar chart, line chart, scatter plot, and map.

630 — Form a mathematical model to represent a functional relationship between a first field and a second field.

632 — The first field is in the first plurality of data fields, the second field is in the second plurality of data fields, and the first field is distinct from the second field.

(A)

VISUAL ANALYSIS OF A DATASET USING LINKED INTERACTIVE DATA VISUALIZATIONS

RELATED APPLICATIONS

This application is related to U.S. patent application Ser. No. 14/628,170, filed Feb. 20, 2015, entitled "Systems and Methods for Providing Adaptive Analytics in a Dynamic Data Visualization," which is incorporated by reference herein in its entirety.

This application is related to U.S. patent application Ser. No. 14/628,176, filed Feb. 20, 2015, entitled "Systems and Methods for Providing Drag and Drop Analytics in a Dynamic Data Visualization Interface," which is incorporated by reference herein in its entirety.

This application is related to U.S. patent application Ser. No. 14/628,181, filed Feb. 20, 2015, entitled "Systems and Methods for Using Analytic Objects in a Dynamic Data Visualization Interface," which is incorporated by reference herein in its entirety.

This application is related to U.S. patent application Ser. No. 14/628,187, filed Feb. 20, 2015, entitled "Systems and Methods for Using Displayed Data Marks in a Dynamic Data Visualization Interface," which is incorporated by reference herein in its entirety.

TECHNICAL FIELD

The disclosed implementations relate generally to data visualization and more specifically to systems, methods, and user interfaces that enable users to interact with data visualizations to analyze data.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface. In addition, when a dashboard has multiple related data visualizations, it is not apparent how changes to one visualization would affect the other visualizations.

SUMMARY

Some implementations provide a new way of linking two or more distinct data visualizations, where linkage is defined by equations in a mathematical model associating a data field in one data visualization with one or more data fields in another data visualization. In addition, some implementations provide a new way of interacting with displayed data visualizations, allowing the user to dynamically change one or more values in one data visualization and displaying modeled computed values in a related data visualization. In addition to dynamically modifying existing data to create hypothetical values, some implementations also enable users to create one or more new (hypothetical) data marks in a data visualization and automatically create corresponding data marks in the linked related data visualization.

In a simple case, there are two linked data visualizations, with one or more data fields in the second data visualization whose values correlate with the values of one or more data fields in the first data visualization based on a mathematical model. Some implementations extend this to collections of three or more interrelated data visualizations so that user manipulation in one data visualization propagates mathematically to all of the other data visualizations in the linked collection.

Analysts commonly make predictions based on historical data. However, in some cases, an analyst wants to know the outcome if some information were different from what actually happened. For example, a person may ask a question like "if I had hired 10 more sales people, what would my revenue be this year?" In some cases, a user has other information that is not yet reflected in the data. For example, a database may only have three quarters of data for a calendar year, so year to date totals are incomplete. The user may have knowledge of information for the fourth quarter and want to use it for analysis instead of the incomplete data stored in the database.

Disclosed implementations address the deficiencies and other problems associated with existing data visualization applications, enabling users to interact directly with data visualizations to conduct "what-if" analysis that uses both data from a data source as well as hypothetical changes. The hypothetical changes are propagated to one or more other related data visualizations.

Some implementations provide a first data visualization and a second data visualization concurrently displayed in the same graphical user interface. In some implementations, a user directly interacts with the first data visualization on the graphical user interface. In response, the first data visualization is updated in real-time. In addition, corresponding data values in the second data visualization are adjusted in real-time. For example, the user selects and drags one or more graphical marks and/or indicators in the first data visualization. The locations and/or shapes of the corresponding graphical marks in the second data visualization are adjusted and displayed accordingly. Some implementations provide a user interface for dynamic user interaction with data visualizations. This functionality has various benefits for users, including allowing users to easily interact with the data visualizations and visualize the outcome of the interactions.

In accordance with some implementations, a method executes at an electronic device with a display. For example, the electronic device can be a smart phone, a tablet, a notebook computer, or a desktop computer. The method displays a first data visualization and a second data visualization concurrently on the display. In some implementations, the first data visualization is based on a first plurality of data fields from a data source, and the second data visualization is based on a second plurality of data fields from the data source. In some implementations, the first and second data visualizations display graphical marks representing values of the data fields in the first plurality and the second plurality respectively.

The method forms a mathematical model to represent a functional relationship between a first field and a second field. In some implementations, the first field is in the first plurality of data fields and the second field is in the second plurality of data fields, and the first field is distinct from the second field.

The method receives a first user input on a first displayed graphical mark at a first location in the first data visualization, thereby moving the first graphical mark to a second location in the first data visualization. In some implementations, the first location corresponds to an actual data value of the first field, the second location corresponds to a first hypothetical value of the first field, and the first hypothetical value is different from the actual value.

The method also adjusts a displayed location of a corresponding second graphical mark in the second data visualization using an a first adjusted value for the second field computed using the first hypothetical value of the first field as input to the mathematical model.

In some implementations, the first data visualization and second data visualization have view types selected from among: bar chart, line chart, scatter plot, and map.

In some implementations, the first plurality of data fields and the second plurality of data fields share a time data field, which is distinct from the first and second fields, and the first and second data visualizations have time axes corresponding to the time data field.

In some implementations, the method further receives a second user input on the first displayed graphical mark at the second location in the first data visualization, thereby moving the first graphical mark to a third location in the first data visualization. In some implementations, the third location corresponds to a second hypothetical value of the first field, and the second hypothetical value is different from the actual value.

In some implementations, the method further adjusts the displayed location of the corresponding second graphical mark in the second data visualization using a second adjusted value for the second field computed using the second hypothetical value of the first field as input to the mathematical model.

In some implementations, after receiving the user input, the method displays the first graphical mark as a pair of component marks. In some implementations, the first component mark corresponds to the actual data value of the first field and the second component mark corresponds to the hypothetical value of the first field.

In some implementations, the method displays the second graphical mark as a pair of component marks. In some implementations, the first component mark is at an original location of the second graphical mark and the second component mark is at the adjusted display location.

In some implementations, the method further receives a second user input on a plurality of first displayed graphical marks at respective first locations in the first data visualization, thereby moving the plurality of first graphical marks to respective second locations in the first data visualization. In some implementations, the plurality of first locations correspond to actual data values of the first field, the second locations correspond to hypothetical values of the first field, and the hypothetical values are different from the actual values.

In some implementations, the method further adjusts displayed locations of corresponding second graphical marks in the second data visualization using adjusted values for the second field computed using the hypothetical values of the first field as input to the mathematical model.

In some implementations, the method further displays an indicator bar proximate to the selected first displayed graphical marks, receives a third user input to move the indicator bar, and moves the plurality of first graphical marks corresponding to the movement of the indicator bar.

In some implementations, the method further displays an indicator bar proximate to the selected first displayed graphical marks, receives a fourth user input on the indicator bar in the first data visualization thereby changing a shape of the indicator bar, adjusts one or more first graphical marks in the first data visualization corresponding to the adjusted shape of the indicator bar, and updates the second data visualization by adjusting displayed locations of one or more second graphical marks corresponding to the adjusted one or more first graphical marks. In some implementations, the displayed locations of the one or more second graphical marks are determined by computing values for the one or more second graphical marks using the mathematical model.

In some implementations, after adjusting the displayed location of the corresponding second graphical mark in the second data visualization, the method receives a second user input on the second displayed graphical mark at the adjusted display location in the second data visualization, thereby moving the second graphical mark to a new location in the second data visualization. In some implementations, the new location corresponds to a target data value of the second field. In some implementations, the method adjusts the location of the corresponding first graphical mark in the first data visualization using a value computed using the target value of the second field and the mathematical model.

In some implementations, a computing device includes one or more processors, memory, a display, and one or more programs stored in the memory. The programs are configured for execution by the one or more processors. The one or more programs include instructions for performing any of the methods described above.

In some implementations, a non-transitory computer readable storage medium stores one or more programs configured for execution by a computing device having one or more processors, memory, and a display. The one or more programs include instructions for performing any of the methods described above.

Thus methods, systems, and graphical user interfaces are disclosed that enable users to easily interact with multiple related data visualizations.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 5A-5J provide additional illustrations of adjusting data marks in one data visualization based on a modeled mathematical relationship with data marks in another data visualization in accordance with some implementations.

FIGS. 6A-6D provide a flowchart of a process for visually analyzing a dataset using linked interactive data visualizations according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
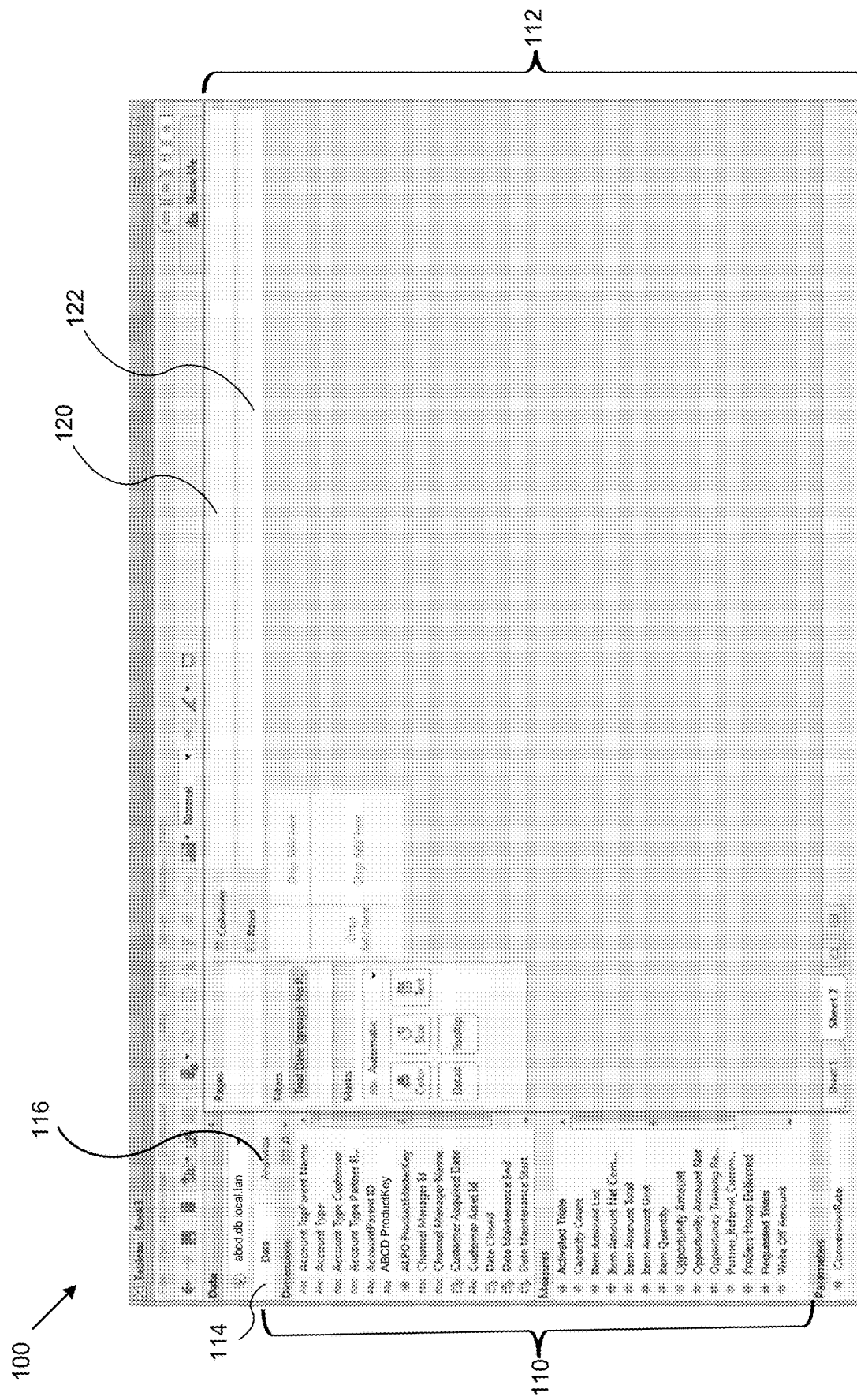
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
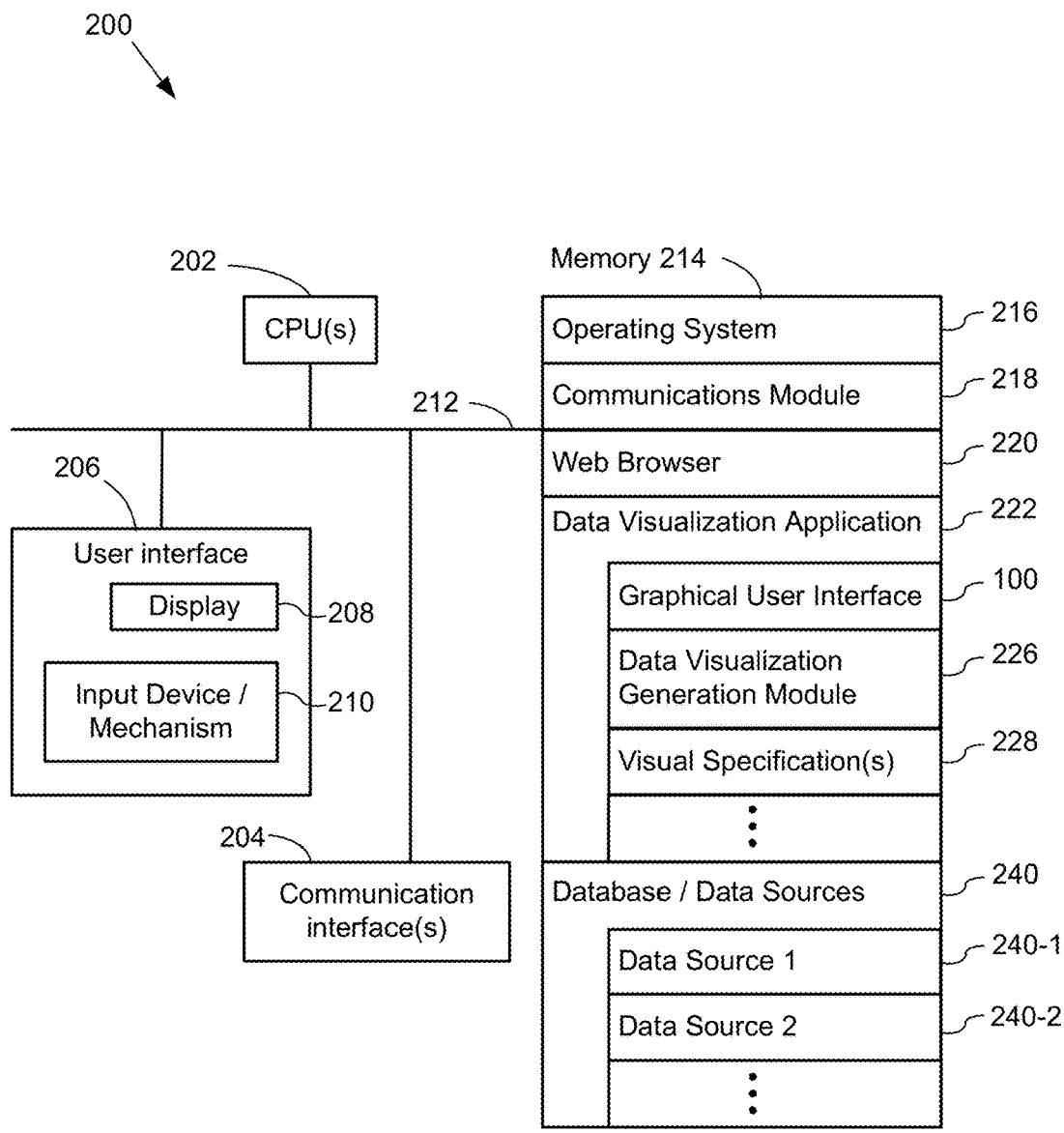
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data source(s), and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222. In some implementations, the data sources are stored as spreadsheet files, CSV files, XML, files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
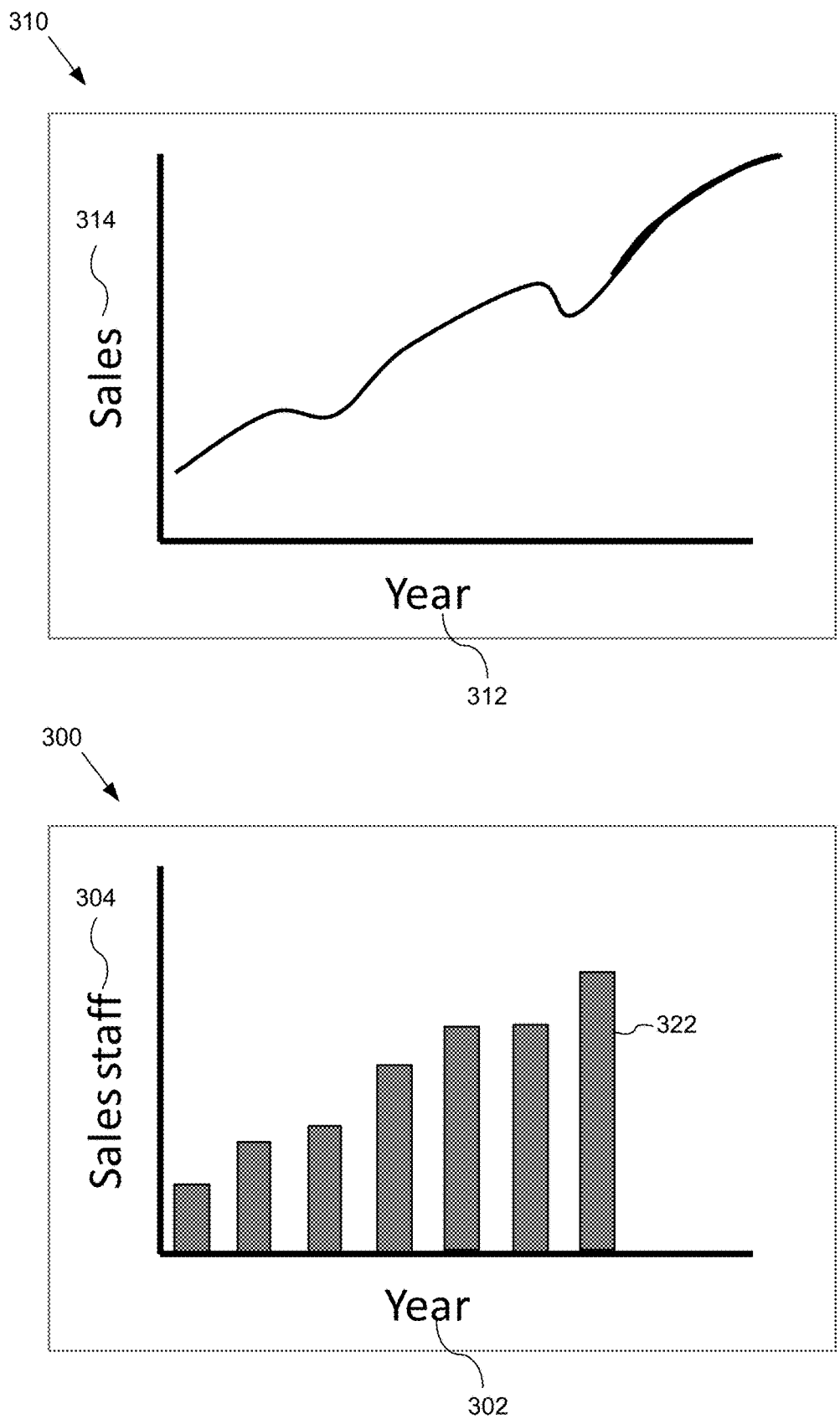
FIGS. 3A-3C illustrate how user adjustments to data marks in one data visualization create corresponding adjustments to data marks in a second data visualization, in accordance with some implementations.
Figure 3B:
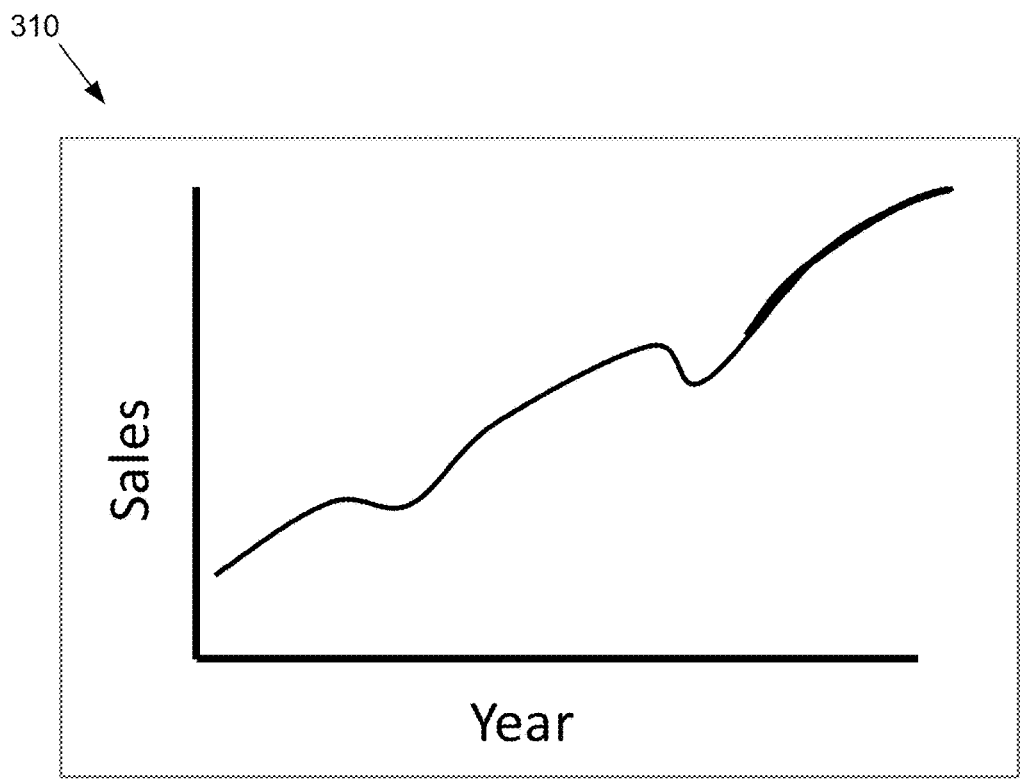
Figure 3B:
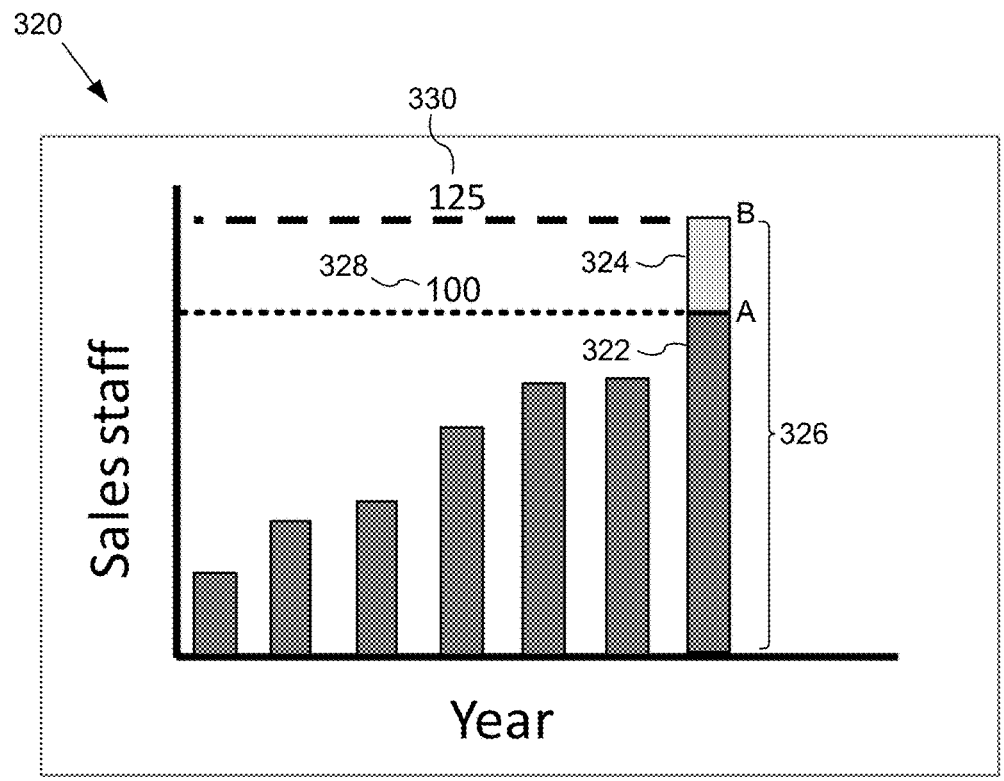
Figure 3C:
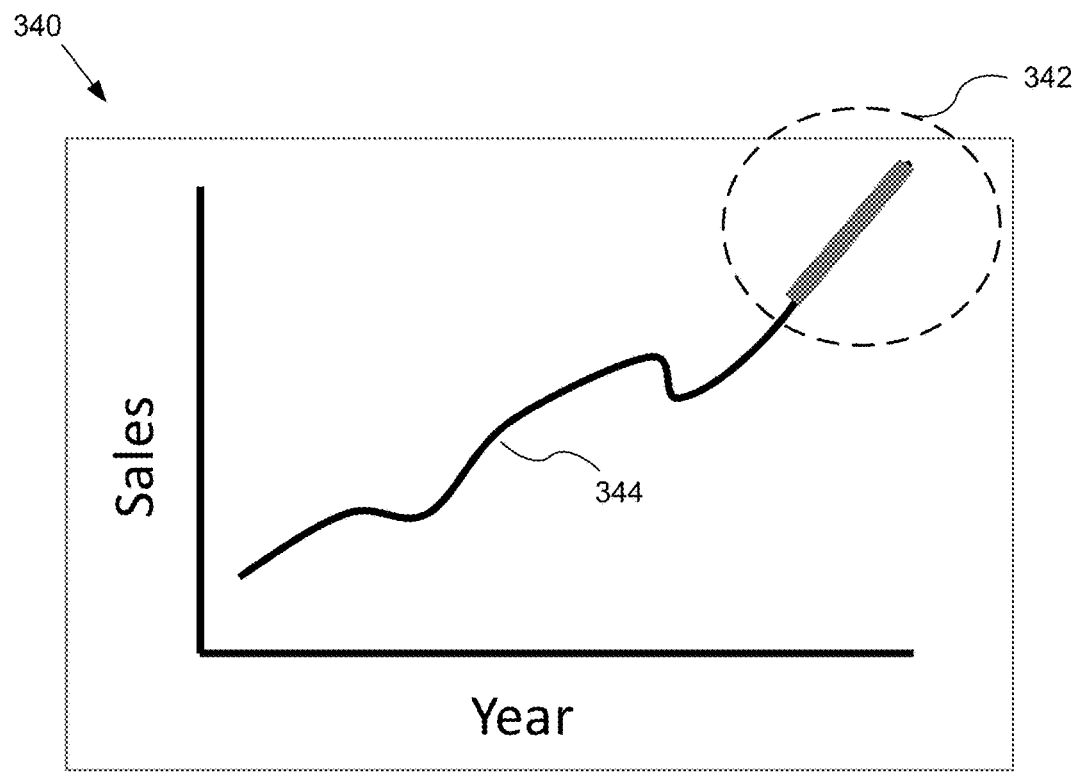
Figure 3C:
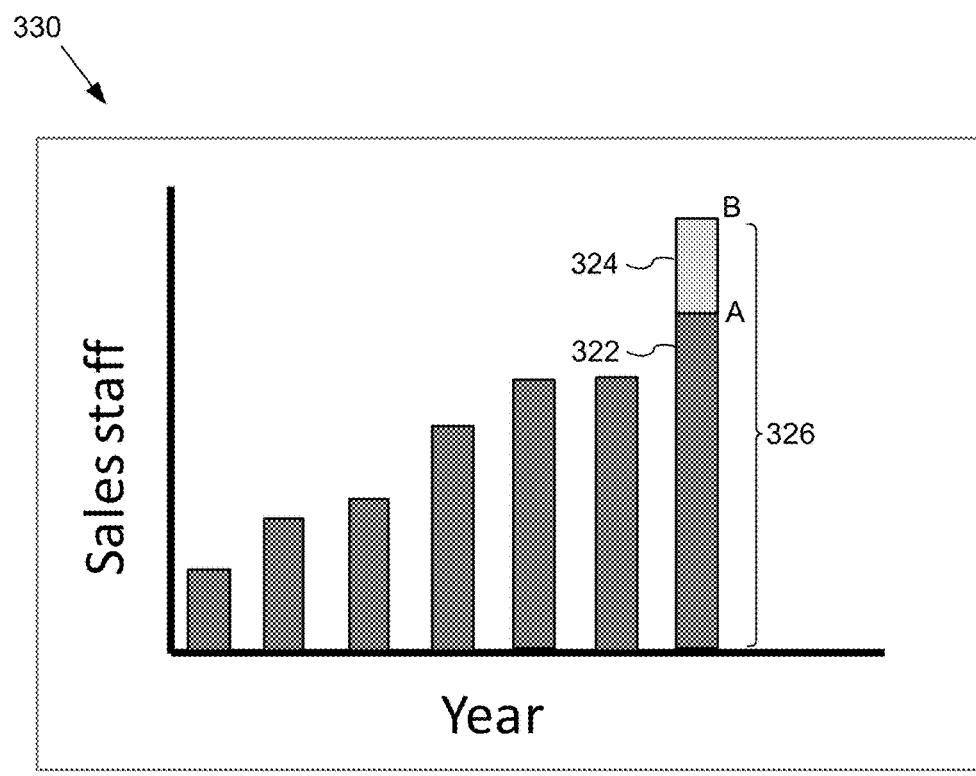

FIGS. 3A-3C illustrate a graphical user interface for a user to dynamically interact with multiple linked data visualizations in accordance with some implementations. In FIG. 3A, the graphical user interface includes a first data visualization 300 and a second data visualization 310, which are concurrently displayed in a data visualization dashboard (e.g., the data visualization region 112 in FIG. 1). In some implementations, a user can directly interact with the first data visualization 300 and/or the second data visualization 310 on the graphical user interface to analyze hypothetical changes to the actual data without modifying the actual data in the data source.

In some implementations, the first data visualization 300 displays a bar chart using bar heights to indicate values of a data field. For example, as shown in FIG. 3A, the first data visualization 300 shows Sales staff 304 over time ("Year" 302). In some implementations, the second data visualization 310 displays a line chart using values from a data field. For example, the second data visualization 310 shows Sales 314 over time ("Year" 312). In some implementations, the data fields related to sales data, sales staff numbers, and time are from the same data source 240. In some implementations, the first data visualization 300 and the second data visualization 310 share a time data field (e.g., Year 302 and Year 312) corresponding to the respective x-axes. When the same data field is used for the respective axes (e.g., x-axes "Year") in the data visualizations, the range and/or increment displayed on the respective axes in the data visualization 300 are typically the same.

In some implementations, a mathematical model is created to represent a functional relationship between a data field used to form the first data visualization 300 and a data field used to form the second data visualization 310. For example, a mathematical formula models the functional relationship between the sales numbers and the number of sales staff members.

In FIG. 3B, the user interacts with a data visualization mark 322 from the first data visualization 300 to create a modified data mark 326 in a modified first data visualization 320. In some implementations, the user interacts with the data visualization by clicking a mouse or tapping a finger on a graphical mark in the first data visualization to move (e.g., drag) the graphical mark from a first location to a second location. The first location corresponds to an actual value of a data field (e.g., actual sales staff) and the second location corresponds to a hypothetical value that is different from the actual value. For example, if a user wants to know how the sales number will change if more sales staff are hired, the user can create the hypothetical scenario by moving a graphical mark corresponding to sales staff. Instead of editing the data value in the data source, the user selects a bar 322 by clicking a mouse or tapping a finger near the first location A. The first location A corresponds to an actual number of sales staff, e.g., 100 people. In response to the user input, an indicator 328 showing the actual number may also be displayed. The user then drags the selected bar 322 from the current height (e.g., location A), to a desired height (e.g., location B) corresponding to a hypothetical number of sales staff, e.g., 125 people. In some implementations, the user interface 100 displays the hypothetical value 330 dynamically as the graphical mark 322 is moved or adjusted.

In some implementations, the second data visualization 310 is not updated until the user interaction is complete, as illustrated in FIG. 3B. In some implementations, the data visualization application 222 dynamically updates the upper data visualization while the user interacts with the lower data visualization. In some implementations, the upper data visualization 340 is updated as soon as the update to the lower data visualization 330 is complete, as illustrated in FIG. 3C.

As noted above, while the user drags the selected bar 322 to adjust the bar height, the data visualization application 222 displays an indicator 330 to represent a hypothetical value (e.g., sales staff). In some implementations, the data visualization application 222 changes the content displayed at the indicator 330 in real-time in response to the user's interaction. For example, while the user drags the selected bar to a higher level, the number displayed at the indicator 330 increases; and while the user drags the selected bar to a lower level, the number displayed at the indicator 330 decreases. The data visualization application 222 updates the indicator 330 to provide real-time feedback to the user in response to the user's interaction with the lower data visualization.

In some implementations, as shown in FIG. 3C, after the user drags the selected bar to a location (e.g., location B in FIG. 3C), the user releases the mouse button or removes the finger from the screen. The change 324 applied to the selected bar may be visually highlighted (e.g., by dimming, changing color, graying out, or in a different pattern) to indicate that the corresponding data field (e.g., number of sales staff) has been changed to a hypothetical value. In response to the user's interaction (e.g., drag and release), the data visualization application 222 adjusts a displayed location of a corresponding graphical mark (e.g., one or more graphical marks in a portion 342 of the upper line chart 340). For example, the shape and/or location of the portion 342 of the line in the upper data visualization 340 is adjusted based on the hypothetical value. In some implementations, the data visualization application 222 adjusts the displayed location and/or shape of the corresponding graphical mark(s) using an adjusted value for the data field (e.g., sales number). In some implementations, the data visualization application 222 computes the adjusted value using the hypothetical value of the data field (e.g., number of sales staff) as an input to the mathematical model representing the functional relationship between the sales numbers and the number of sales staff.

As illustrated in FIG. 3C, some implementations display a modified graphical mark 326 as a pair of component marks 322 and 324, including a first component mark 322 at an original location and a second component mark 324 at the adjusted display location. Similarly, some implementations display graphical marks in the upper data visualization 340 as a pair of component marks. For example, the portion 342 adjusted based on the hypothetical value is highlighted using a different color and/or line width to be distinguished from the original portion 344. In some implementations, the data visualization application displays both the original data from the highlighted region 342 as well as the adjusted data based on the hypothetical changes.

In some implementations (not shown), a user can further interact with the graphical mark at the location corresponding to the hypothetical value (e.g., position B in FIG. 3C) in the data visualization 300, thereby moving the graphical mark to another location (not shown), which corresponds to an updated hypothetical value. In response to the user input, the data visualization application 222 further adjusts the displayed location of the corresponding graphical mark in the upper data visualization (e.g., the portion 342) using the updated hypothetical value. In some implementations, the data visualization application 222 computes the adjusted value using the updated hypothetical value as an input to the mathematical model.

In some implementations (not shown) after the upper data visualization is updated, the user can also directly interact with the graphical mark(s) in the upper data visualization to move a selected graphical mark to a new location corresponding to a target outcome value of the corresponding data field. In response to the user's input, the data visualization application 222 adjusts the location(s) of the corresponding graphical mark(s) in the lower data visualization. The data visualization application 222 computes the adjusted values corresponding to the target outcome value associated with the upper data visualization using the target outcome value as an input to the mathematical model. In one example, this implementation can help visually demonstrate to the user how many sales staff will be needed in order to reach the target sales number.

FIGS. 4A-4J illustrate a graphical user interface for a user to dynamically interact with multiple related data visualizations in accordance with some implementations. Each of the FIGS. 4A-4J includes a lower data visualization region 400 and an upper data visualization region 480 that are concurrently displayed in a data visualization dashboard. In some implementations, a user can directly interact with graphical marks in the lower data visualization region 400 and/or graphical marks in the upper data visualization region 480 to analyze data, without modifying actual data in the data source.

FIGS. 4A-4J illustrate using a pair of related data visualizations. The lower data visualization region 400 displays a bar chart showing Sales staff 404 for each Year 405. The upper data visualization region 480 displays a line chart showing Sales 406 for each Year 407. In some implementations, the data fields related to sales data, sales staff numbers, and time are from the same data source. In some instances, the bar chart and the line chart share a time data field corresponding to the respective x-axes. When the same data field is used for the respective axes in the lower data visualization region 400 and the upper data visualization region 480, the range and/or increment displayed on the respective axes (e.g., x-axes "Year") for the data visualizations are typically the same.

In some implementations, a mathematical model is created to represent a functional relationship between a data field used to form the lower data visualization and a data field used to form the upper data visualization. For example, a mathematical model is created to represent a functional relationship between the sales numbers and the number of sales staff members.

Figure 4A:
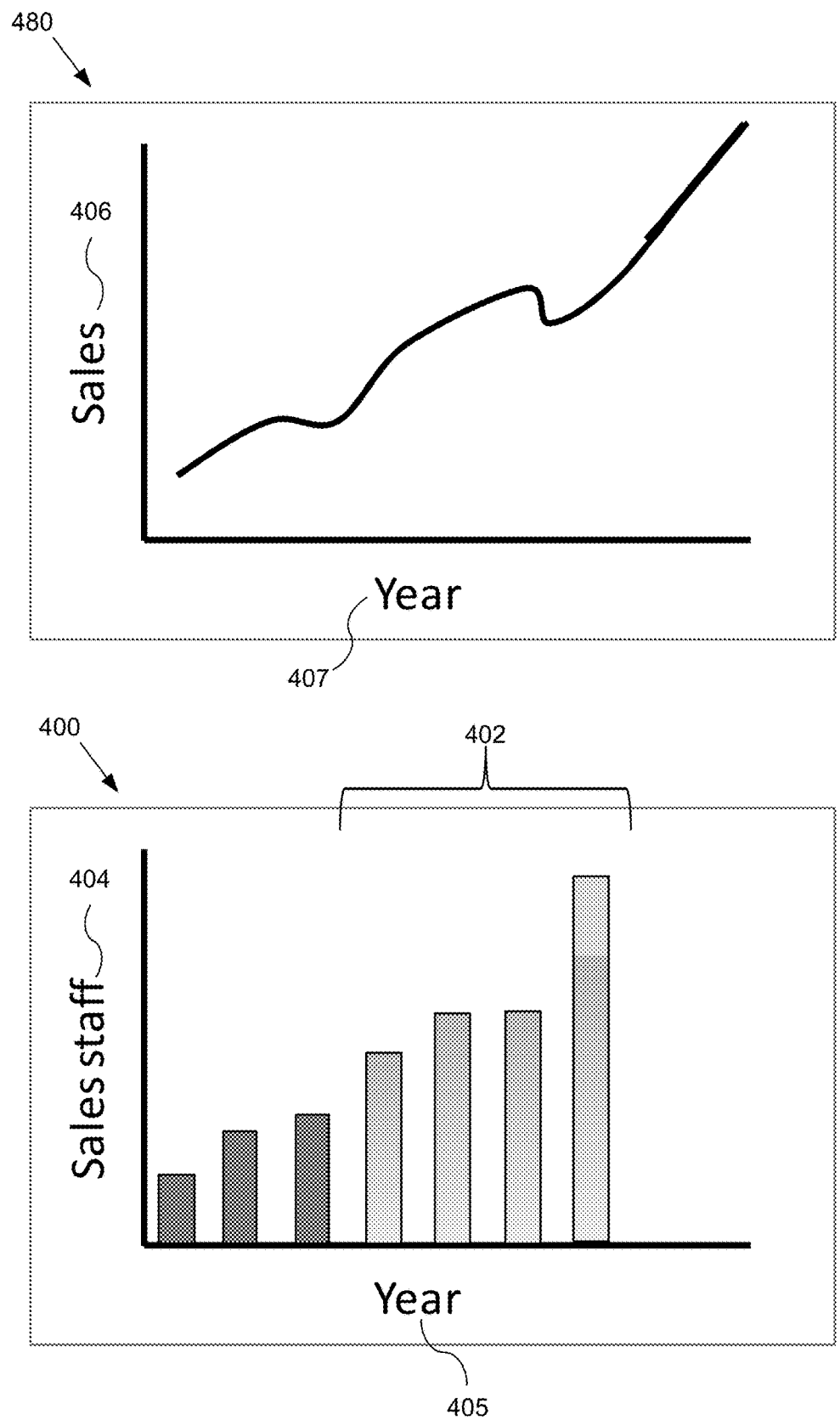
FIGS. 4A-4J illustrate how user adjustments to data marks in one data visualization can be grouped and create corresponding adjustments to data marks in a second data visualization, in accordance with some implementations.

As shown in FIG. 4A, in some implementations, the user directly interacts with the lower data visualization region 400 by selecting more than one graphical mark at respective locations corresponding to actual data values. For example, the user selects a plurality of bars 402 by moving and clicking the mouse or tapping the bars on the screen. In some implementations, the data visualization application 222 visually highlights the plurality of selected graphical marks (e.g., bars) in the lower data visualization region 400. For example, the visual highlights are implemented by dimming, changing color, graying out, different patterns, or other techniques.

In some implementations, the user then drags the graphical marks 402 to change the respective locations and/or respective shapes corresponding to hypothetical values that are different from the actual values. For example in response to the user's dragging, the data visualization application 222 changes the bar heights of the selected bars in the lower data visualization region 400. In another example (not shown), the data visualization application 222 can also change the locations of the selected bars in the lower data visualization region 400 to indicate hypothetical values in other years. In some implementations, one or more indicators (e.g., numbers as shown in FIG. 3B) representing the respective hypothetical values of the selected graphical marks are visually displayed to the user in real-time with the user's interaction.

In some implementations, when the user releases the mouse button or removes fingers from the screen, the data visualization application 222 adjusts the displayed locations of the corresponding graphical marks in the upper data visualization region 480 using adjusted values for the corresponding data field (e.g., the sales field). In some implementations, the data visualization application 222 computes the adjusted values using the hypothetical values of the field (e.g., the sales staff field) as input to the mathematical model.

In some implementations, the updates to the upper data visualization region 480 are in real-time as the user adjusts the lower data visualization region 400.

Figure 4B:
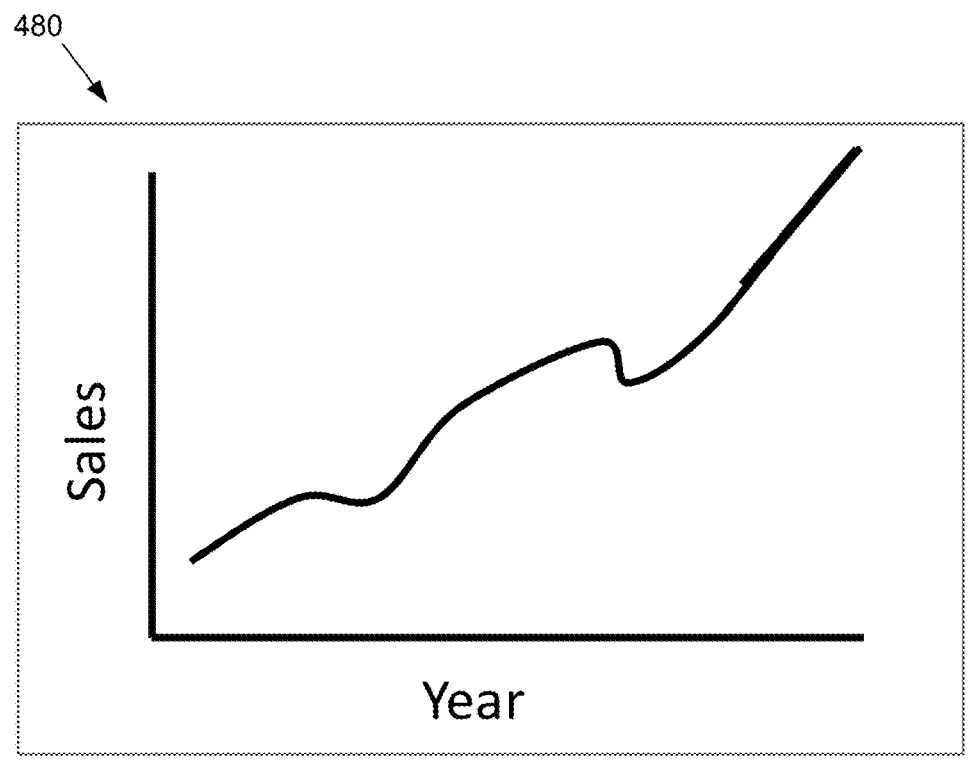
Figure 4B:
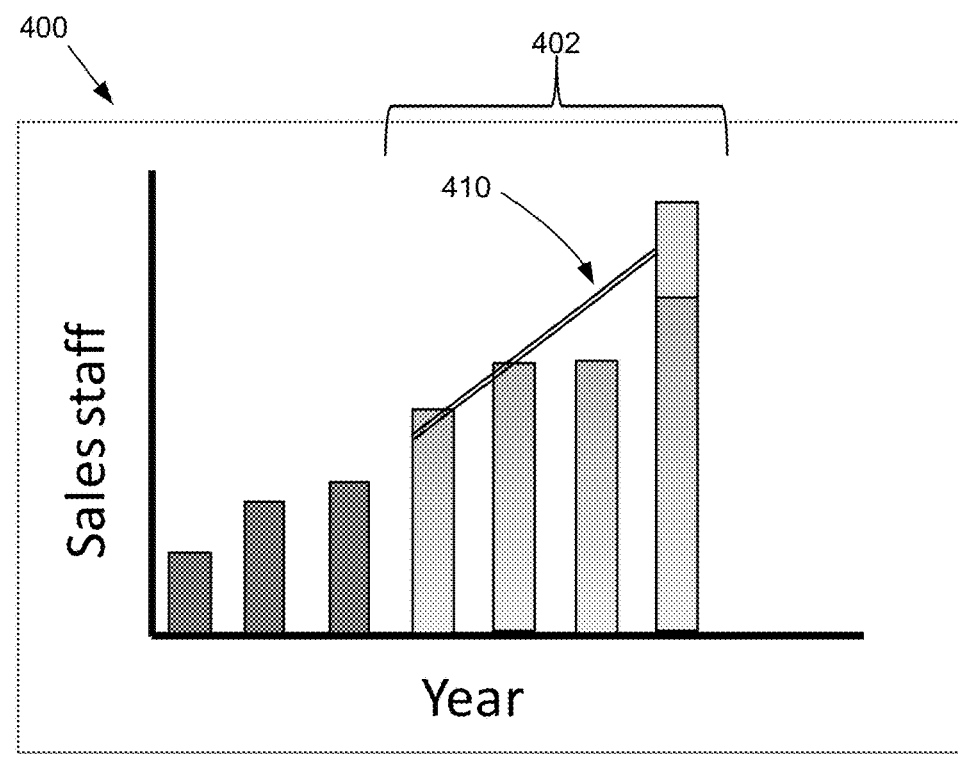

As shown in FIG. 4B, in some implementations, when the user selects a plurality of graphical marks (e.g., bars 402), the data visualization application 222 generates and displays an indicator (e.g., an indicator bar 410) proximate to the plurality of selected graphical marks 402. In some implementations, the indicator bar 410 is a straight line generated based on a predetermined rule, such as linear regression. Alternatively, the indicator bar 410 can be curved or in another suitable shape.

Figure 4C:
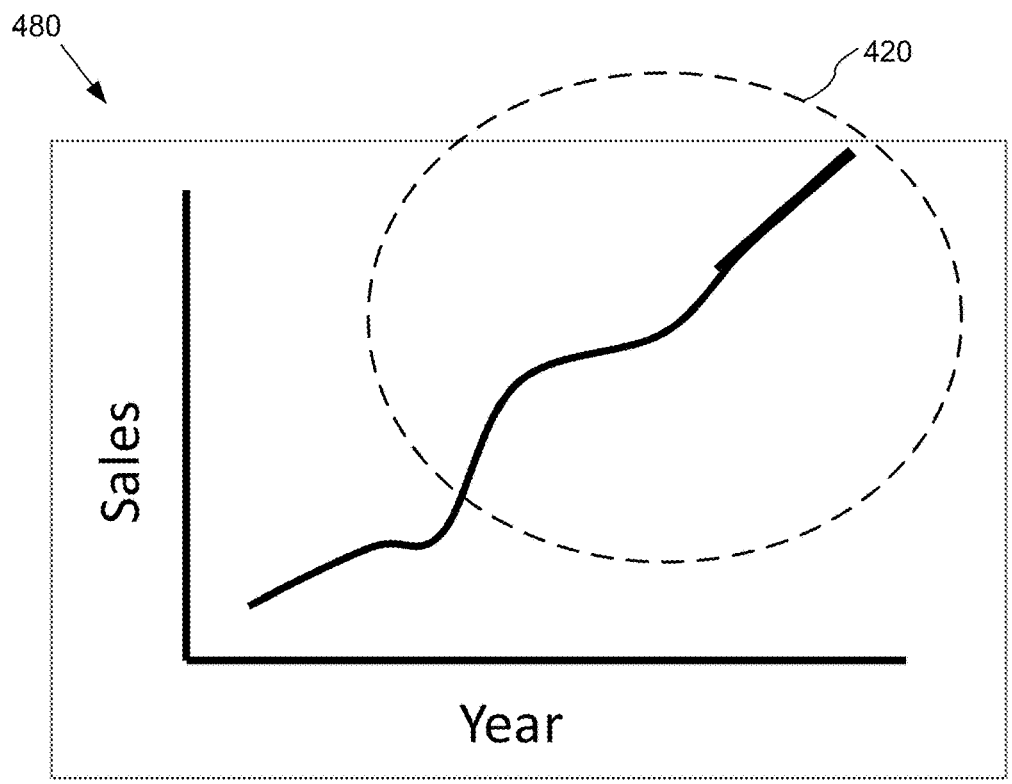
Figure 4C:
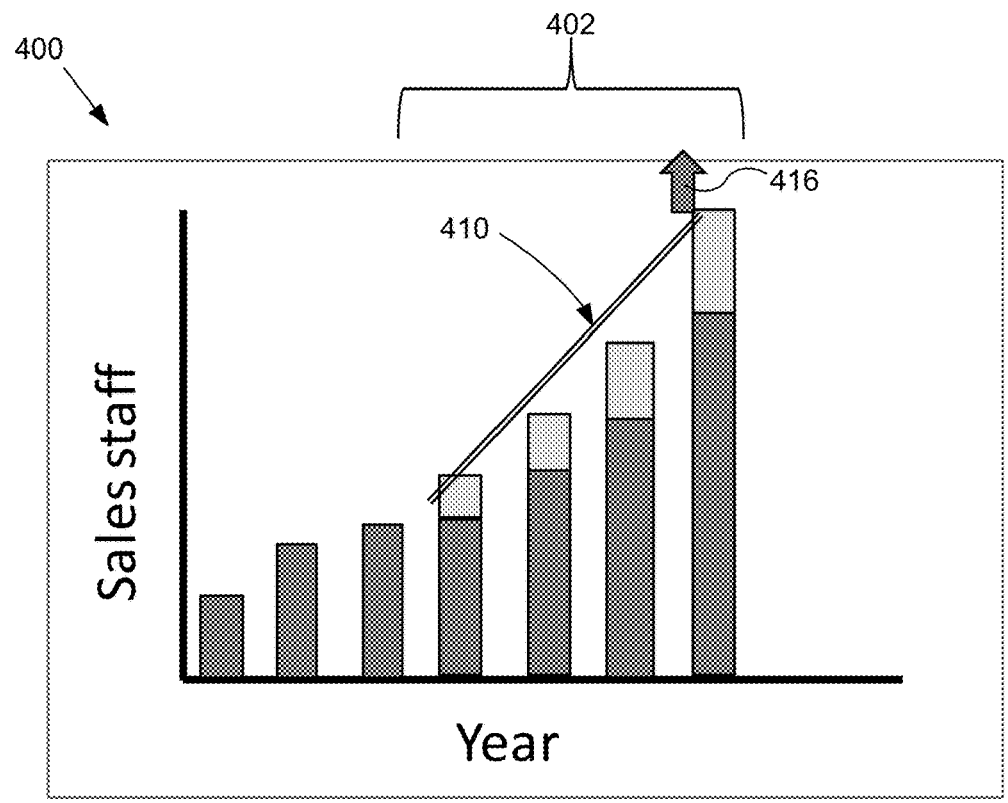

In some implementations as shown in FIG. 4C, the user directly interacts with the lower data visualization region 400 by dragging one end 416 (or areas proximate to the end 416) of the indicator bar 410 to change the slope of the indicator bar 410. For example, the user changes the slope of the indicator bar 410 to get a 10% compounding increase in sales staff in the lower data visualization region 400. In some implementations, the user drags the indicator bar 410 by clicking and dragging a mouse or directly using fingers to tap on the screen. In some implementations, in response to the user's interaction, the data visualization application 222 adjusts the plurality of selected graphical marks in the lower data visualization region 400 based on the change to the indicator bar 410 in real-time. For example, when the user drags one end 416 to increase the slope the indicator bar 410, the heights of the respective selected bars 402 increases. In one example, the different bars may have different increase amounts, and each increase amount corresponds to a hypothetical value calculated based on the slope change of the indicator bar 410.

In some implementations, after the user releases the mouse button or removes fingers from the screen, the data visualization application 222 adjusts a portion 420 of the line chart in the upper data visualization region 480 corresponding to the selected plurality of graphical marks in the lower data visualization region 400. In some implementations, the data visualization application 222 adjusts the portion 420 of the line chart using adjusted values for the corresponding data field (e.g., the sales field). In some implementations, the data visualization application 222 computes the adjusted values using the hypothetical values (e.g., calculated based on the slope change of the indicator bar 410) as input to the mathematical model.

Figure 4D:
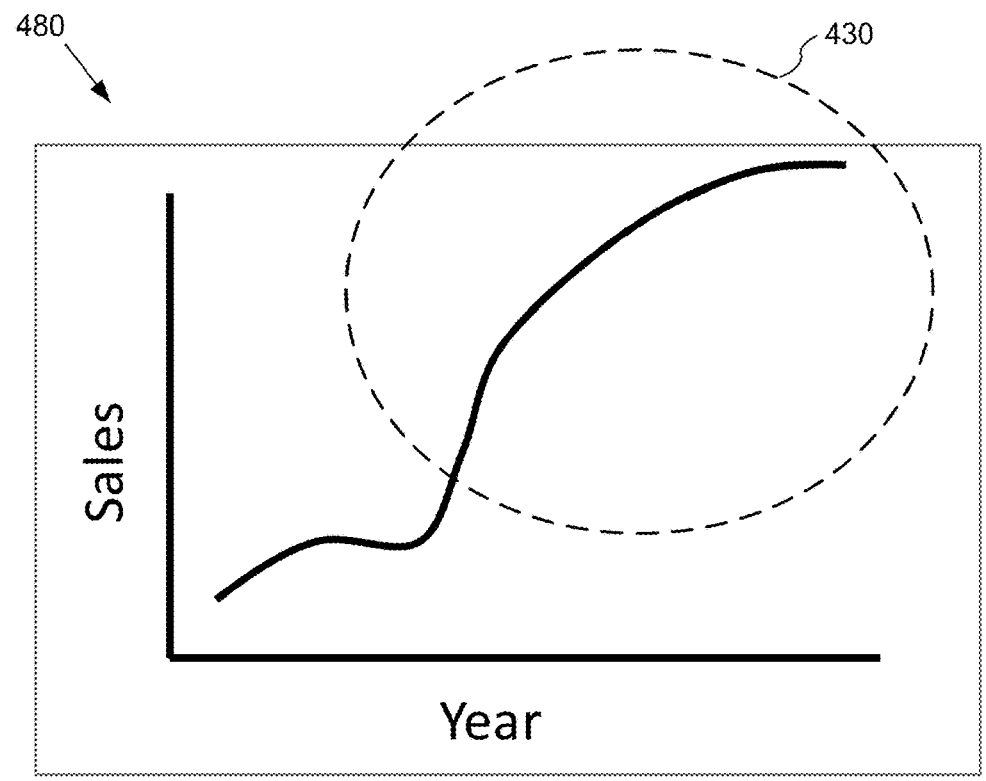
Figure 4D:
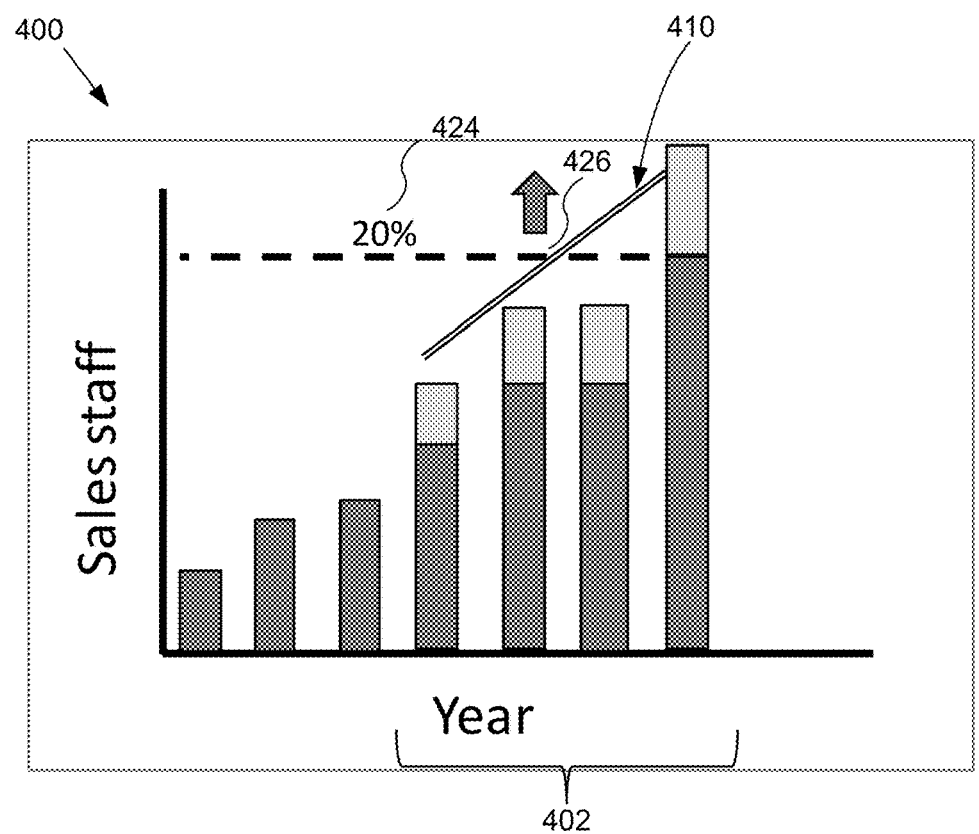

In some implementations, as shown in FIG. 4D, the user directly interacts with the lower data visualization region 400 by dragging up (e.g., using mouse or fingers tapping on the screen) a portion 426 that is or proximate to a mid-portion of the indicator bar 410 to change the location of the indicator bar 410. For example, the user drags up the indicator bar 410 to a higher location to indicate an increase of the sales staff by 20% for each selected year. In some examples as shown in FIG. 4D, an arrow is displayed to indicate the dragging direction. In real-time response, the height of the each selected bar 402 increases based on the location change of the indicator bar 410. In some implementations, the adjusted height of each selected bar 402 corresponds to a hypothetical value calculated based on the location change of the indicator bar 410. In some implementations, the data visualization application 222 also displays an indicator label 424 to represent the real-time increase (e.g., 20%) corresponding to the user's dragging the indicator bar 410.

In some implementations, in the upper data visualization region 480, after the user releases the mouse button or removes fingers from the screen, the data visualization application 222 adjusts a portion 430 of the line in the upper data visualization region 480 that corresponds to the selected plurality of graphical marks 402 in the lower data visualization region 400. In some implementations, the data visualization application 222 computes adjusted values using the hypothetical values of the number of sales staff field as input to the mathematical model, and adjusts the portion 430 of the line chart using the adjusted values of the sales field.

In some implementations, the updates in the upper data visualization region 480 are in real-time as the user adjusts marks in the lower data visualization region 400.

Figure 4E:
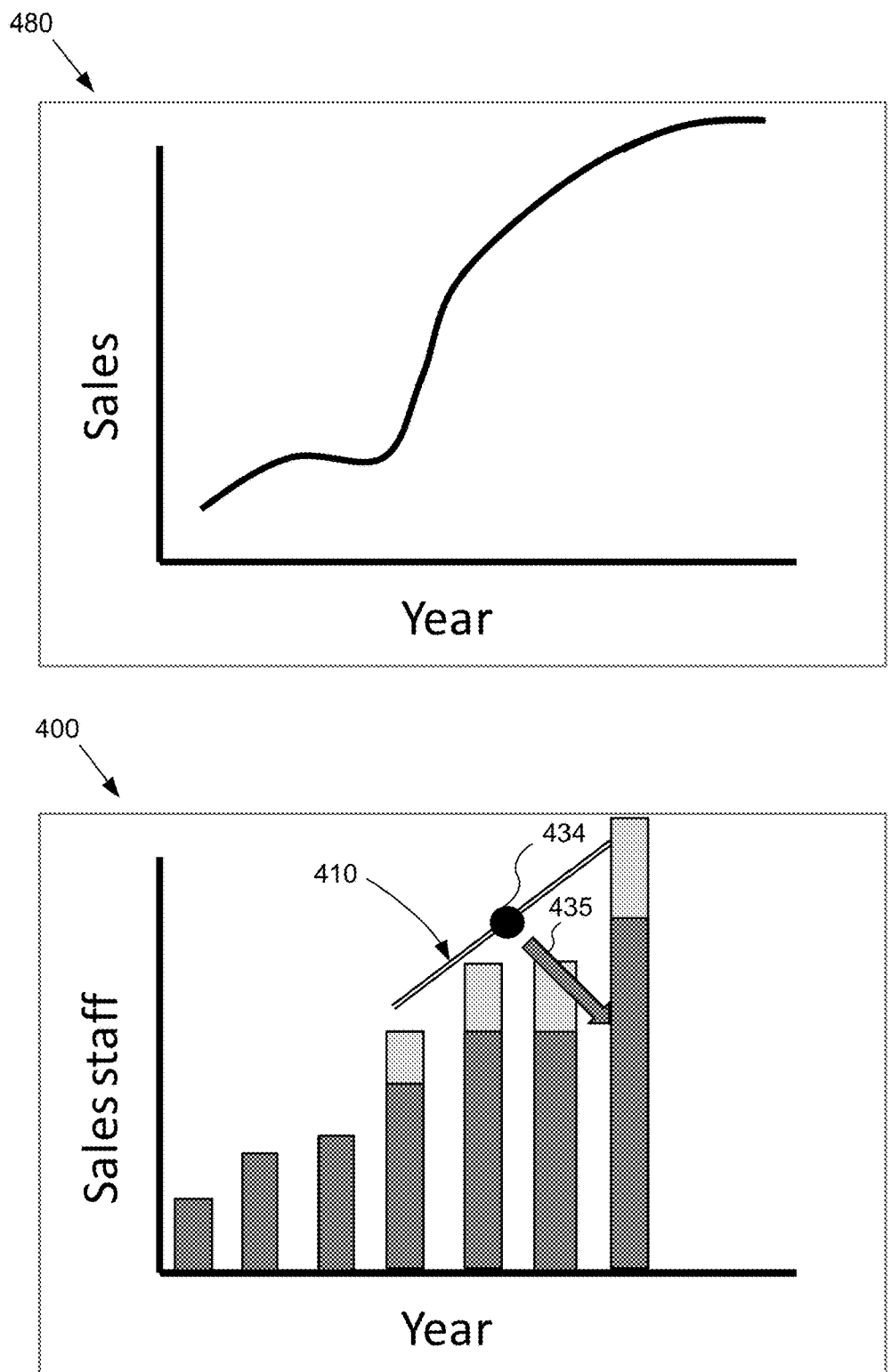

In some implementations as shown in FIG. 4E, the user can also change the shape, e.g., curvature, of the indicator bar 410 in the lower data visualization region 400 by direct interactions. For example, the user may click or tap an area approximate to the indicator bar 410, and in response, the data visualization application 222 displays an indicator dot 434 on the indicator bar 410. In some examples, the user interaction includes single clicking a mouse, double clicking a mouse, single/double tapping on the screen, or using a finger to press on the screen to apply a pressure within a predetermined range, etc. In some implementations, an arrow 435 is displayed near the indicator dot 434 to show a direction for changing the curvature of the indicator bar 410. By changing the indicator bar 410 to a curved bar, an exponential change in the number of sales staff can be applied to the selected bars, and the corresponding adjustments can be made to the upper data visualization region 480 to visually display the sales result.

Figure 4F:
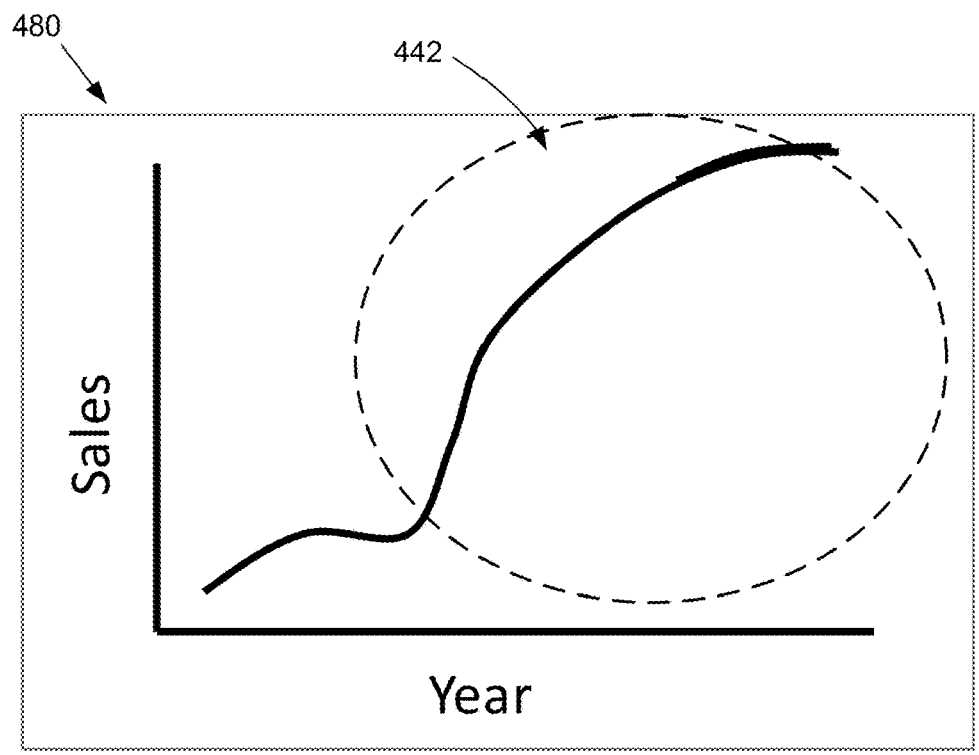
Figure 4F:
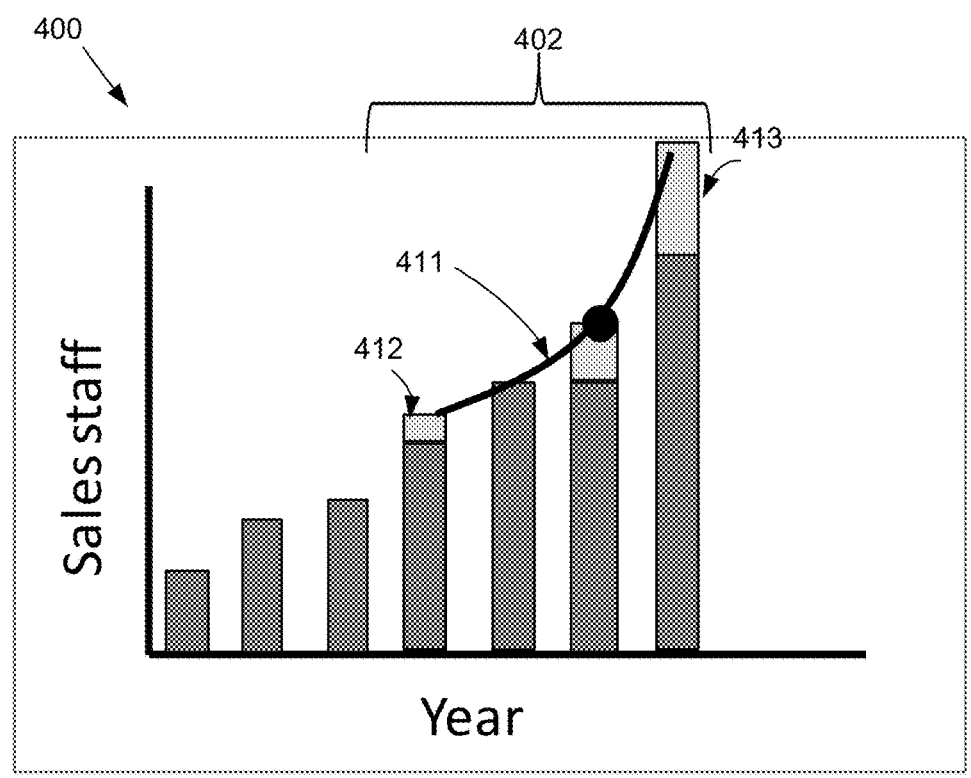

For example, as shown in FIG. 4F, the user drags the indicator bar 410 to convert the bar into a curved indicator bar 411 to show an exponential increase in the number of sales staff. In real-time while dragging, the data visualization application 222 adjusts the respective heights of the selected bars 402 to represent the respective hypothetical values of the sales staff number field. For example, in response to the exponential increase indicated by the curved indicator bar 411, an increase value of a leftmost bar 412 is smaller than an increase value of a rightmost bar 413.

After the user releases the dragging, the data visualization application 222 adjusts the upper data visualization region 480 according to the hypothetical values of the sales staff numbers in the selected years. For example as shown in FIG. 4F, the data visualization application 222 calculates adjusted values using the hypothetical values as input to the mathematical model. The data visualization application 222 further adjusts a portion 442 of the line chart corresponding to the selected years using the adjusted values for the corresponding data field (e.g., the sales number field).

In some implementations, the updates to the upper data visualization region 480 are in real-time as the user adjusts the lower data visualization region 400.

Figure 4G:
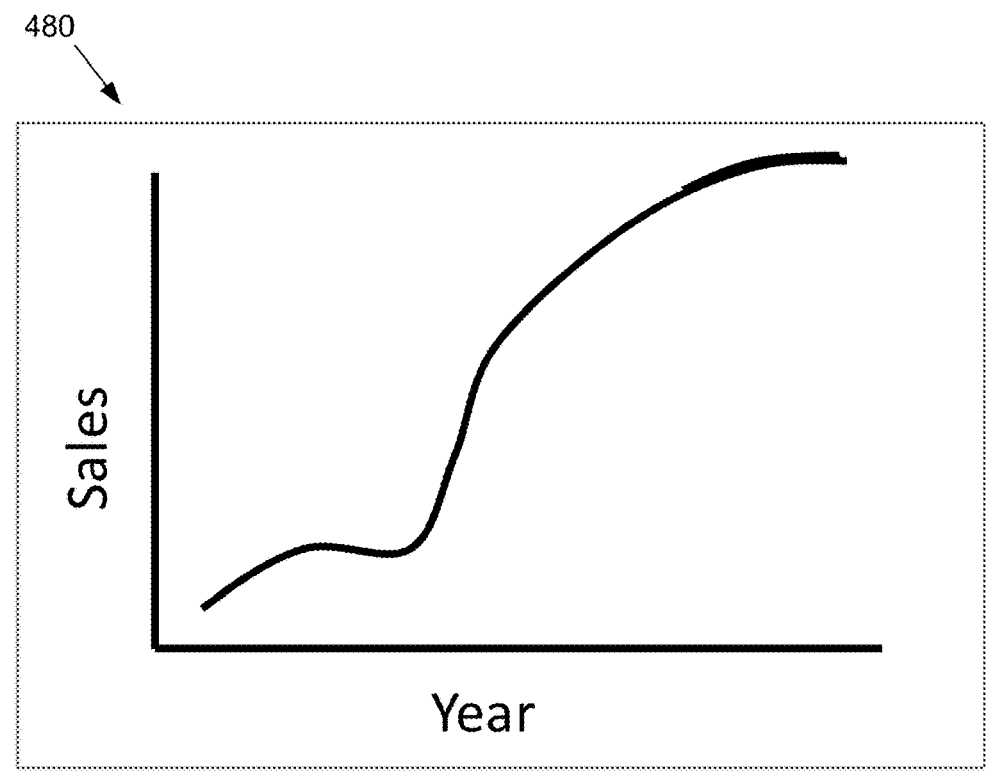
Figure 4G:
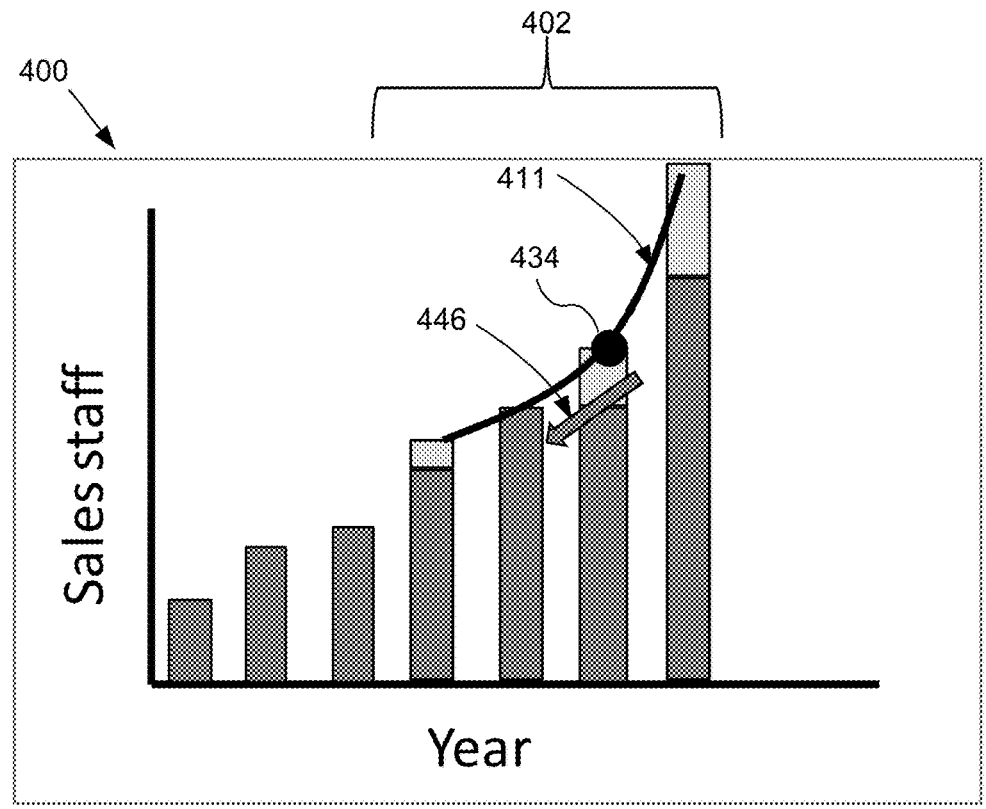

In some implementations as shown in FIG. 4G, the curvature of the curved indicator bar 411 can be further adjusted by the user dragging the indicator 434 in another direction. In some implementations, an arrow 446 is displayed to provide a visual indication of the changing direction.

Figure 4H:
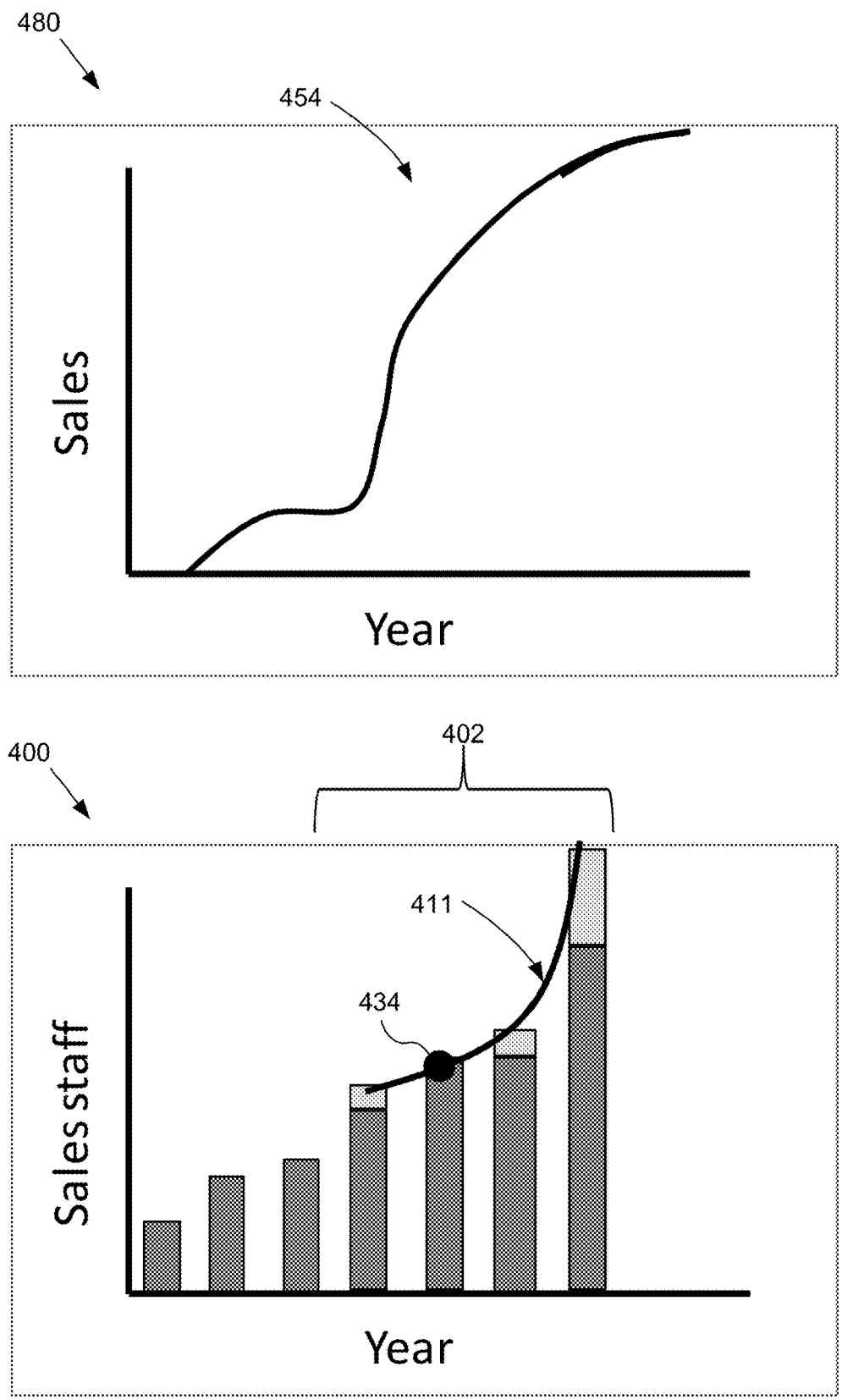

In some implementations as shown in FIG. 4H, the data visualization application 222 dynamically changes the respective heights of the selected bars 402 in real-time in response to the curvature change of the curved indicator bar 411. In some implementations after the user releases the dragging interaction, the data visualization application 222 adjusts a corresponding portion 454 of the line chart in the data visualization region 480 in accordance with the change of the selected bars 402 in the data visualization region 400.

Figure 4I:
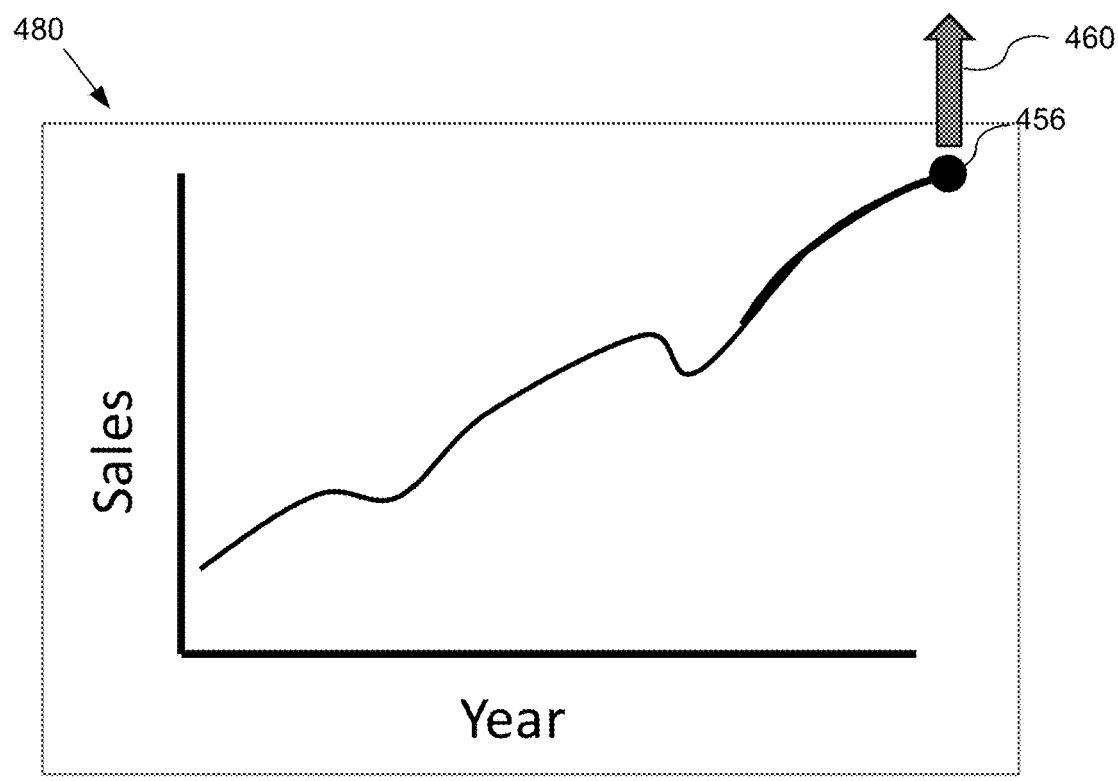
Figure 4I:
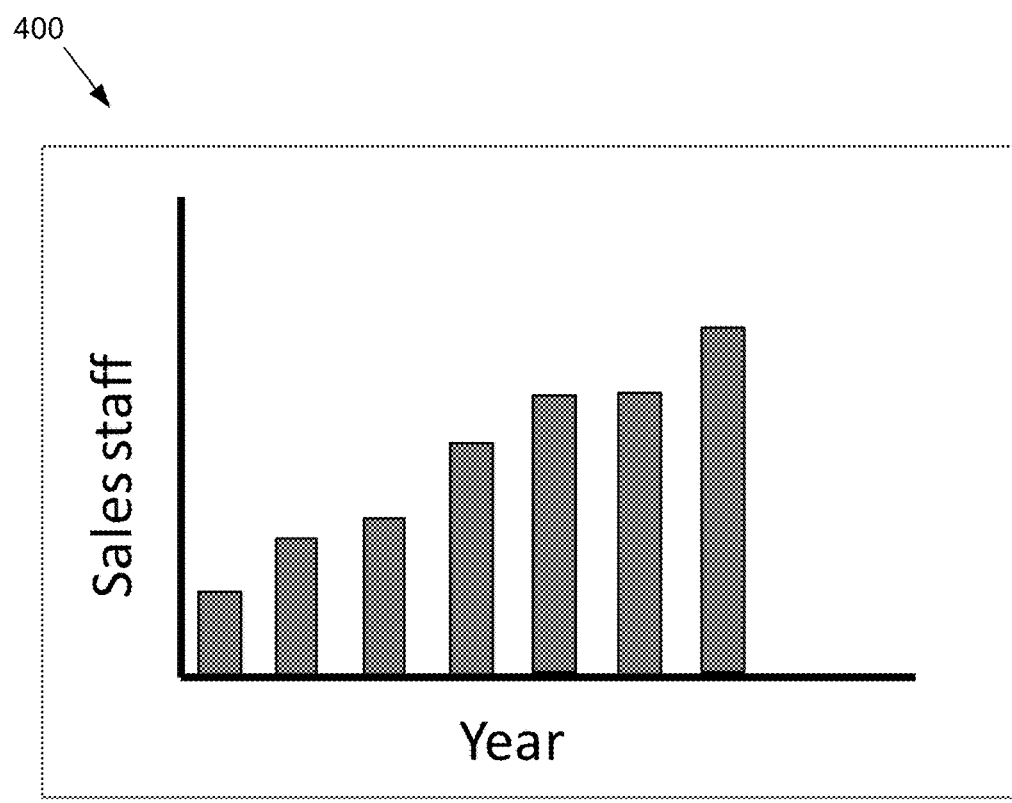
Figure 4J:
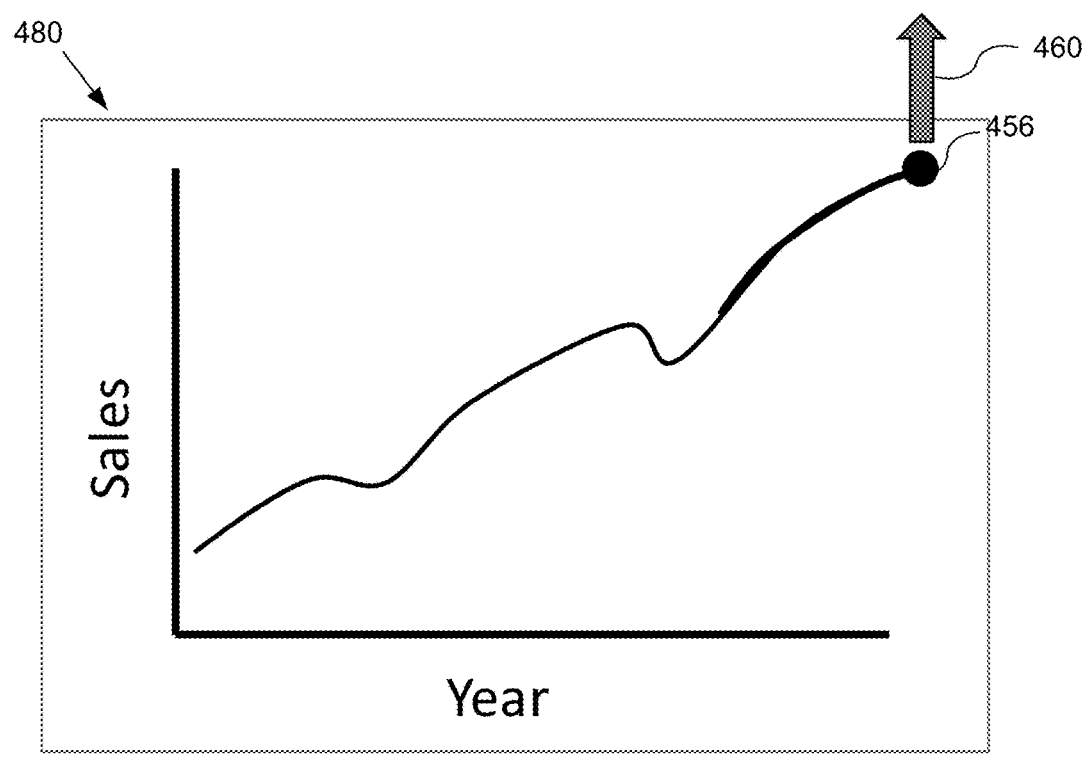
Figure 4J:
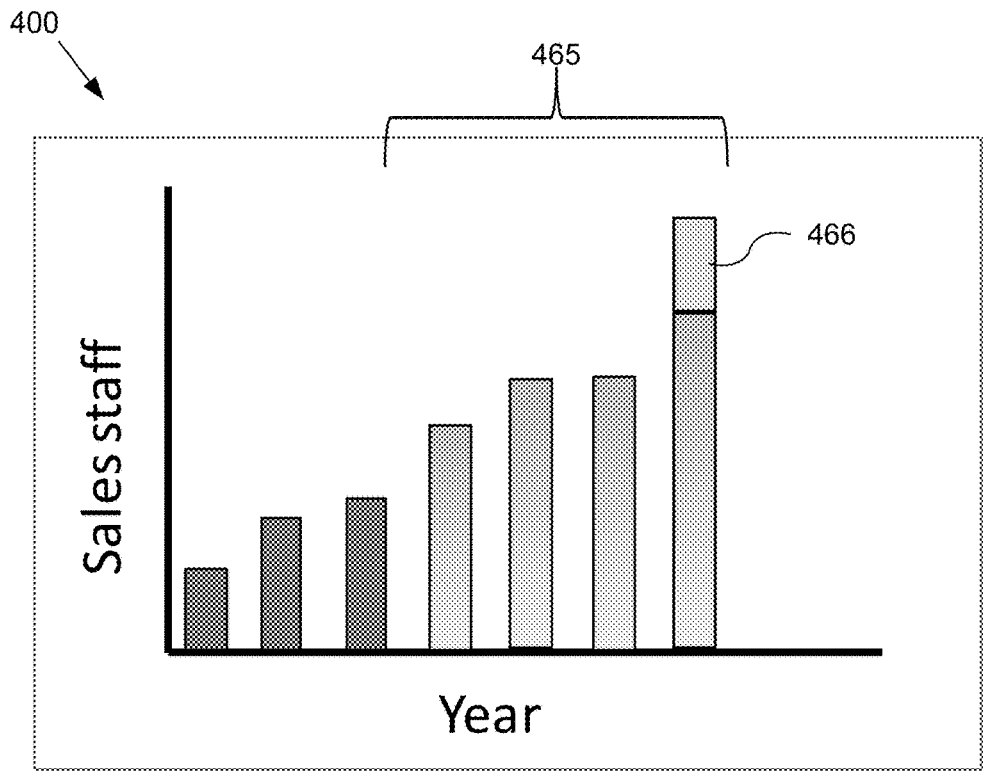

In some implementations as shown in FIGS. 4I and 4J, the user directly interacts with the upper data visualization region 480 to indicate a desired outcome (e.g., a desired sales number) in selected year(s). In the example of FIG. 4I, the user clicks or taps a point on the line chart. The selected point on the line chart is indicated by in an indicator dot 456. An arrow 460 is displayed to indicate the dragging direction. The user then drags the selected point to a desired location to indicate a desired sales number. In some implementations, while the user drags to change the location of the indicator point 456 on the line chart, the data visualization application 222 adjusts a portion of the line chart proximate and connected to the point 456 in real-time. For example, while the user drags up the point 456 to a desired location, a portion of the line chart proximate and connected to the point 456 is adjusted upward.

As shown in FIG. 4J, after the user completes the dragging interaction, the data visualization application 222 calculates the values for the lower data visualization region 400 in response to the desired outcome indicated by the user's interaction with the upper data visualization region 480. In some implementations, the data visualization application 222 adjusts the shapes of the corresponding graphical marks in the lower data visualization region 400 to visually demonstrate what needs to be changed to achieve the desired outcome. In some implementations, a plurality of graphical marks 465 correspond to the portion changed on the upper line chart, and the graphical marks 465 are adjusted accordingly. For example in FIG. 4J, the user drags up the point 456 on the line chart to indicate a target sales number in a certain year. In response to the user input, the data visualization application 222 calculates how many sales staff members are needed to achieve the target sales number, and adjusts respective bar heights of the corresponding bars (e.g., bar 466) in the lower data visualization region 400. In some implementations, a single change to a target value in one year may result in adjusting values in the lower data visualization region 400 for multiple years.

In some implementations, the updates to the lower data visualization region 400 occur in real-time as a user adjusts the location of data marks in the upper data visualization region 480.

FIGS. 5A-5J provide additional illustrations of adjusting data marks in one data visualization based on a modeled mathematical relationship with data marks in another data visualization. In FIGS. 5A-5D, the user is interacting with the data visualization presented on the left (shown inside a rectangle for emphasis). For these figures, the data visualization on the left will sometimes be referred to as the "input data visualization." The data visualization on the right in these figures is affected by the user's interactions according to a mathematical model. The data visualization presented on the right will sometimes be referred to as the "output data visualization." For these figures, assume the relationship between [Sales] and [Sales Staff] has been modeled by the equation [Sales]=10,000+20,000*[Sales Staff].

Most of the data visualizations shown in FIGS. 5A-5J use bar charts, but the linkage and interactive override behavior can be applied more broadly. For example, implementations can link between various types of charts and there can be more than one input and/or output. Mathematical models can use multiple data inputs and a single data input can be used in multiple models.

Figure 5A:
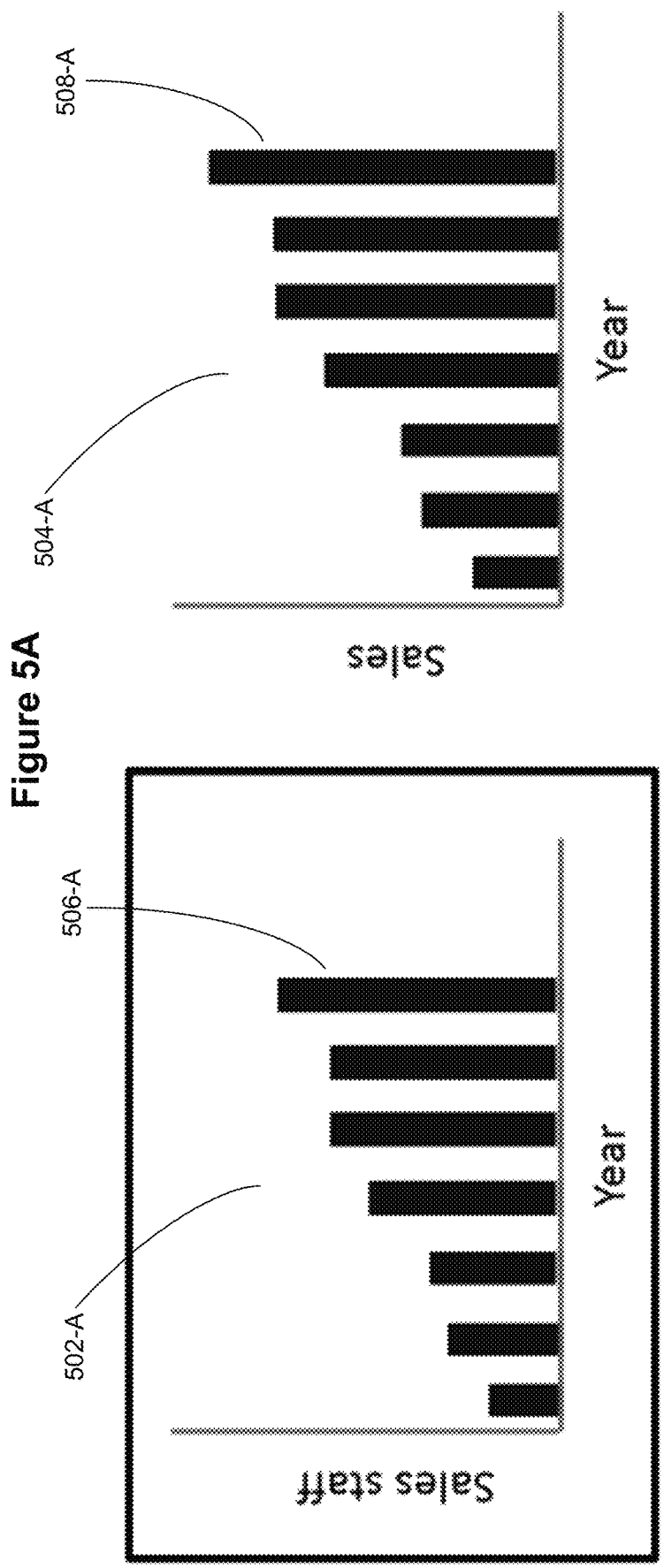

FIG. 5A shows the input data visualization 502-A and the output data visualization 504-A based on the actual data from a data source 240. In particular, the rightmost bar 506-A in the input data visualization 502-A shows the number of sales staff for the last year for which data is available (e.g., 2016). The rightmost bar 508-A in the output data visualization 504-A indicates the actual sales for the last year (e.g., 2016, corresponding to the last bar 506-A in the input data visualization 502-A).

The information displayed in the two data visualizations in FIG. 5A is useful. However, how would the sales be different if the sales staff had been different? In FIG. 5B, the user interacts directly with the graphical mark (the rightmost bar 506-A), changing the height of the bar, as shown by the arrow 516 (e.g., performing a dragging operation with a mouse or a finger on a touch sensitive display). The modified input data visualization 502-B has a rightmost bar that includes the original bar 506-A plus an extension 514 that visually illustrates the change created by the user. In some implementations, as the user adjusts the height, the data visualization application 222 displays the corresponding value 510 and an indicator line 512.

As the user changes the height of the rightmost bar 506-A, the data visualization application 222 applies the equation that models the relationship between the input data visualization 502-B and the output data visualization 504-B, and updates the height of the rightmost bar 508-B in the output data visualization 504B. In some implementations, the size of the rightmost bar 508-B is updated in real time as the user changes the height of the rightmost bar 506-B in the input data visualization 502-B. In some implementations, the rightmost bar 508B in the output data visualization 504-B is shown in two parts, similar to the rightmost bar in the input data visualization.

In this example, if the user increased the height of the rightmost bar in input data visualization 502-B from 30 sales staff to 40, the value of the rightmost bar 508-C in the output data visualization would increase from 10,000+20,000*30=610,000 to 10,000+20,000*40=810,000.

As illustrated in the input data visualization 502-B, the modified graphical mark is displayed visually (using color, fill pattern, or other means) so the user can tell the difference between the data coming from the database (illustrated by the original bar 506-A) and the change (illustrated by the cross-hatched extension 514).

Figure 5B:
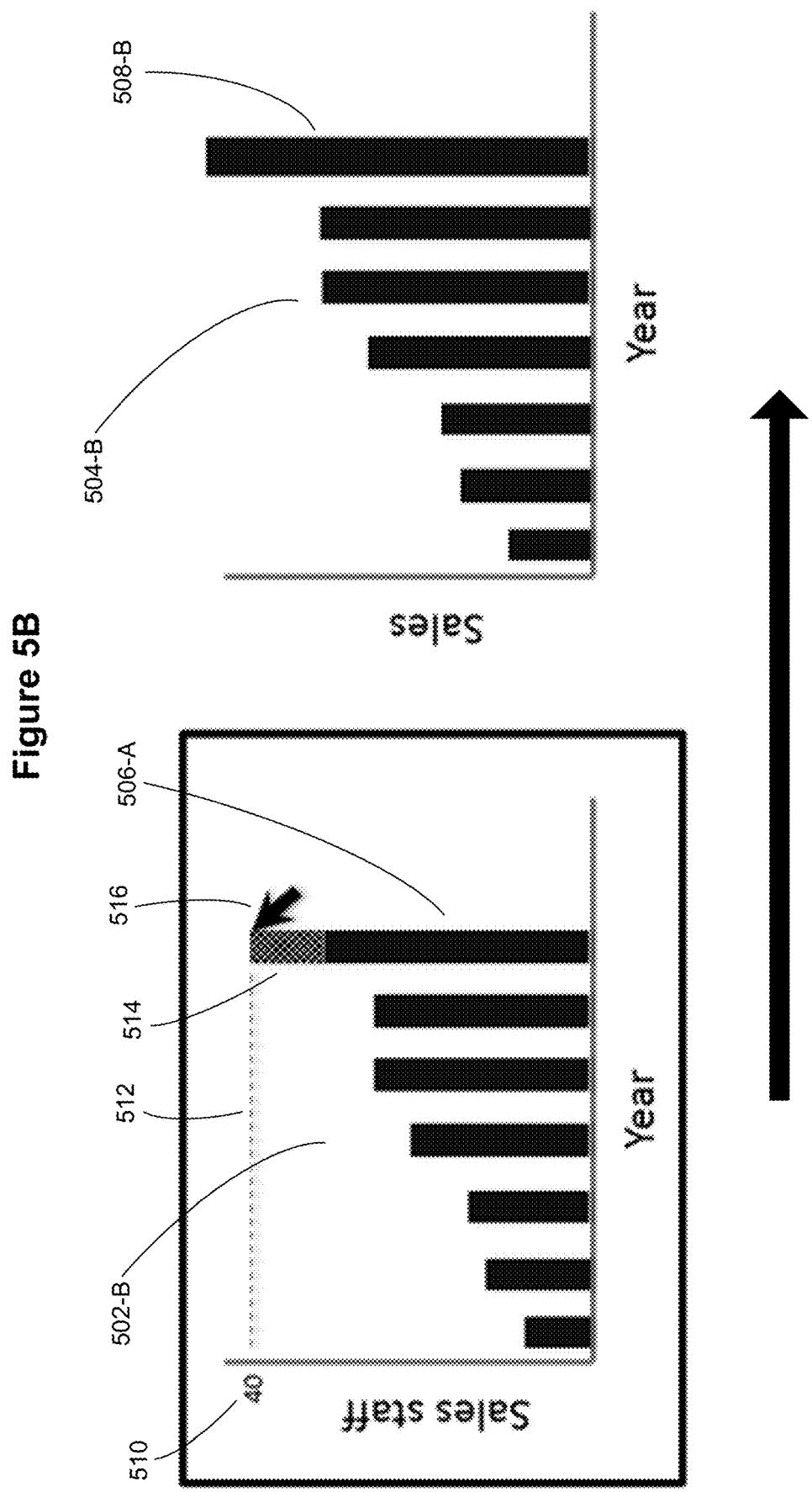
Figure 5C:
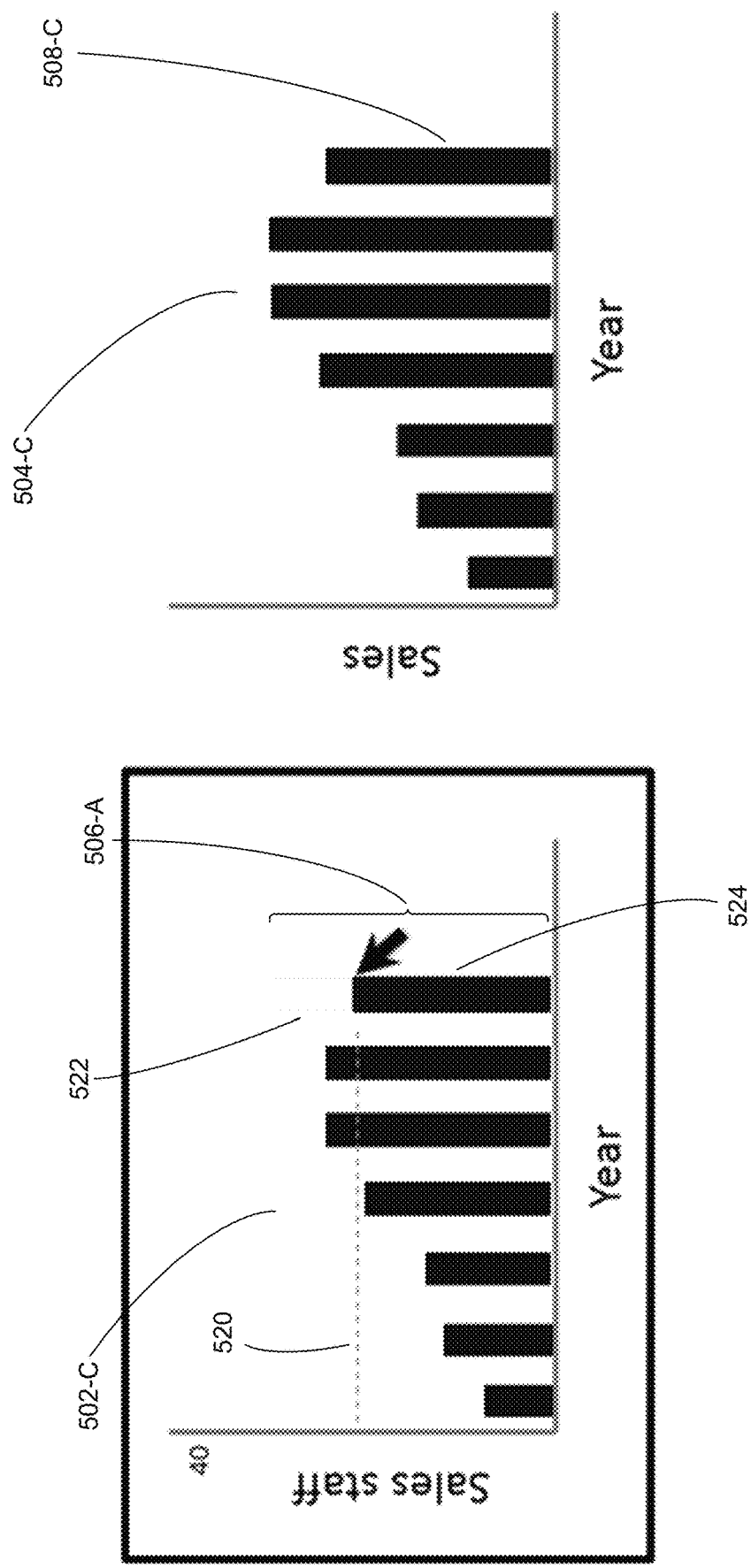

FIG. 5C illustrates that a user can also override the value to set it to a smaller value. In the new input data visualization 502-C, the change 522 is illustrated by an outlined rectangle to indicate that the change was taken away rather than added. The remaining amount 524 is typically shown as a solid bar. In some implementations, an indicator line 520 is shown to indicate the height of the adjusted bar 524. In the output data visualization 504-C, the rightmost bar 508-C is updated based on applying the mathematical model to the revised input data. In some implementations, the rightmost bar 508-C in the output data visualization is displayed similarly to the right most bar in the input data visualization 502-C, including an outlined rectangle to indicate the previous value.

Figure 5D:
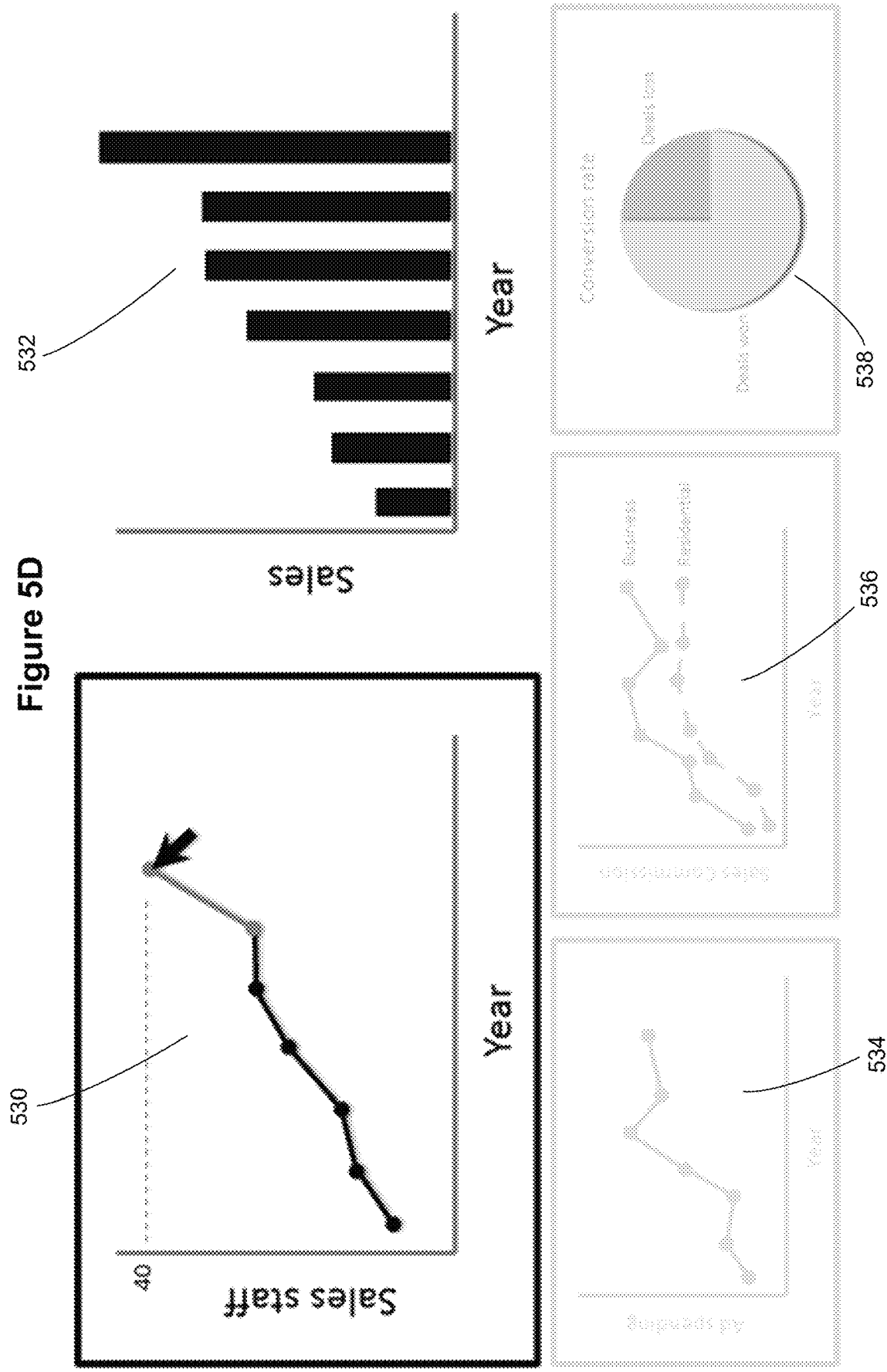

FIG. 5D illustrates some additional features. As in FIGS. 5A-5C above, the input data visualization 530 is modeled against the output data visualization 532, and changes to the input data visualization 530 are propagated to the output data visualization 532. In this figure, the input data visualization is a line chart rather than a bar chart. The disclosed techniques are not limited to any specific data visualization type.

In addition, FIG. 5D illustrates that the output data visualization 532 may be based on multiple input data visualizations. Here, sales depend on sales staff (the first data visualization 530), the amount of money spent on advertising (the second data visualization 534), sales commissions (the third data visualization 536), and sales conversion rate (the fourth data visualization 538). A user may adjust visual marks in any of the input data visualizations and see the output on one or more output data visualizations. In some implementations, the three data visualizations shown on the bottom are dimmed to emphasize that the user is currently modifying the first data visualization 530. In some implementations, the data visualization that the user is modifying is enlarged and/or highlighted.

For FIG. 5E, the mathematical model is a three-year moving average, where the moving average for a given year is based on the current year as well as the previous year and the following year. For example, the formula $Y_n=(X_{n-1}+X_n+X_{n+1})/3$ expresses this relationship. If the yearly sales data is used in an input data visualization and the moving average is displayed in an output data visualization, a change to any one of the years in the input results in changes to three different computed values in the output. Therefore, dragging one data point in a visualization may change multiple values due to dependencies defined in the model (e.g., an Exponentially Weighted Moving Average (EWMA) model or an autoregressive Integrated Moving Average (ARIMA) model).

In FIG. 5E, the initial input data visualization 540 is shown in the top left, and the corresponding output data visualization 541 is shown on the bottom left. The value corresponding to the third bar 542 in the input data visualization 540 is used to compute moving average values corresponding to the second, third, and fourth bars 548 in the output data visualization 541.

On the right in FIG. 5E is the input data visualization 544 with the value corresponding to the third year overridden by the user. The original bar 542 now includes an extension 546 created by user interaction. In the corresponding output data visualization 545, each of the second, third, and fourth bars 550 are now taller based on the three year moving average formula. That is, the height of the each bar in the output is calculated as the average of 3 bars from the input. As a result, overriding the value of the third bar in the input data visualization 544 changes not only the third bar in the output data visualization 545, but also the second and fourth bars. In some implementations, each of the modified bars 550 includes an original bar and an extension as illustrated above in FIGS. 5B and 5C.

Figure 5F:
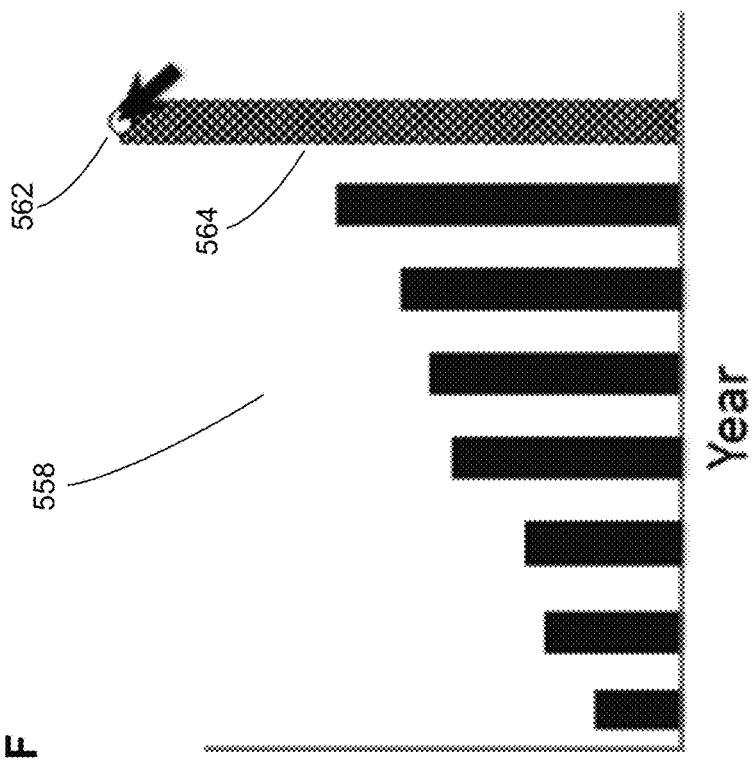
Figure 5F:
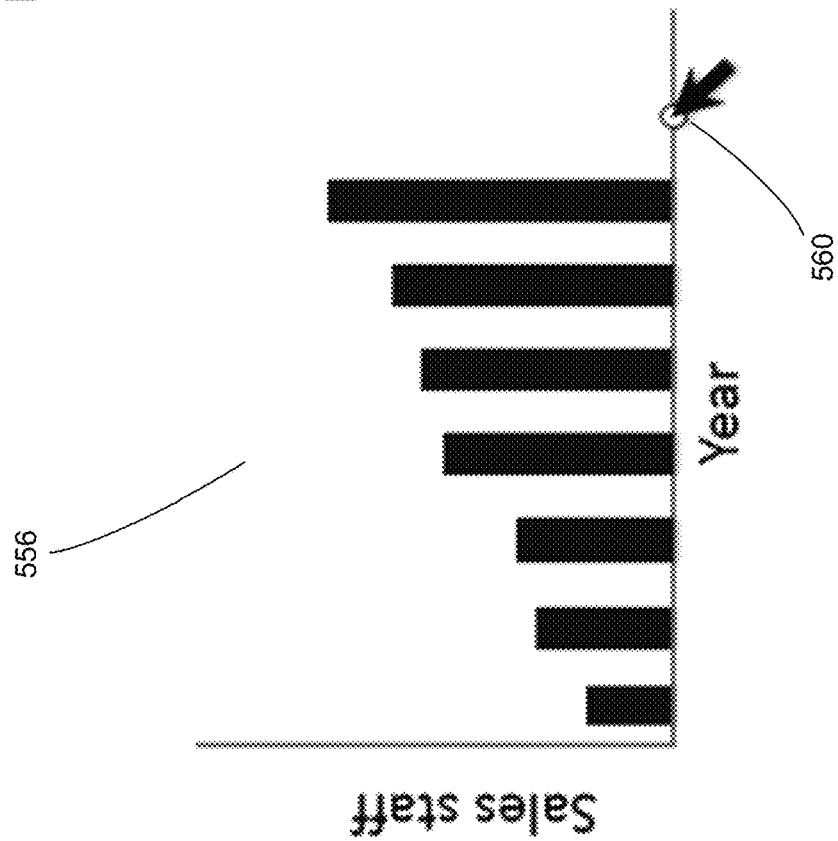

In the examples illustrated in FIGS. 5A-5E, a user modified an existing data mark. In some implementations, user interaction is not limited to existing data marks. The user can also insert new hypothetical data marks. This is illustrated in FIG. 5F. To create a new data mark in some implementations, a user begins a user interaction at an axis point 560, as illustrated in the initial data visualization 556 in FIG. 5F. The user continues the interaction such as by dragging the cursor upwards to a new point 562, thereby creating a completely new data visualization mark 564. This is illustrated in the second data visualization 558 in FIG. 5F. In a linked output data visualization (not shown in FIG. 5F), a new mark is created that corresponds to the new created mark 564.

Figure 5G:
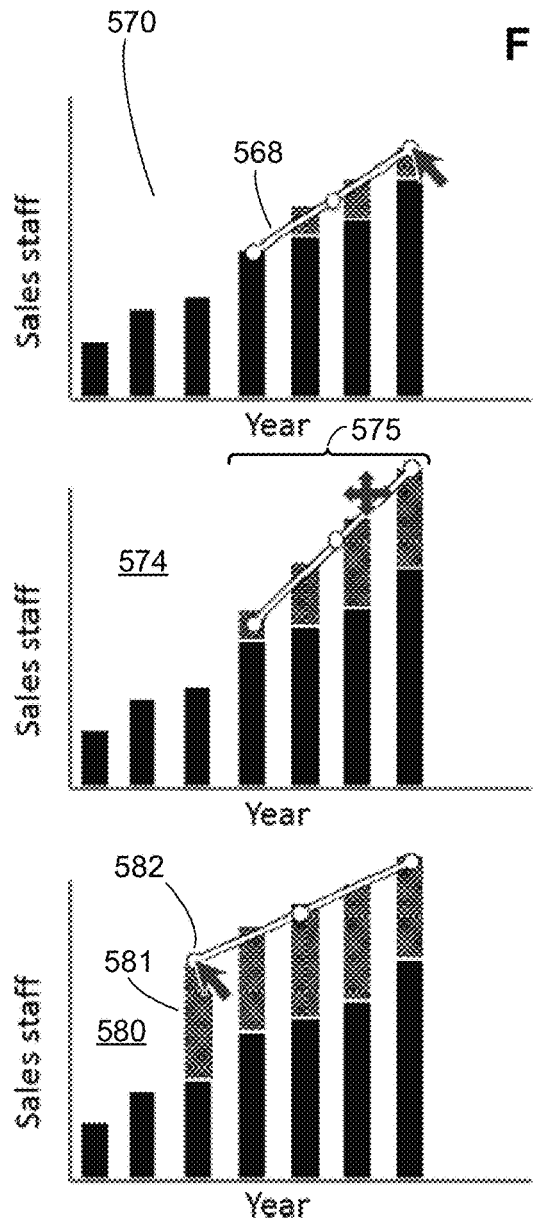
Figure 5G:
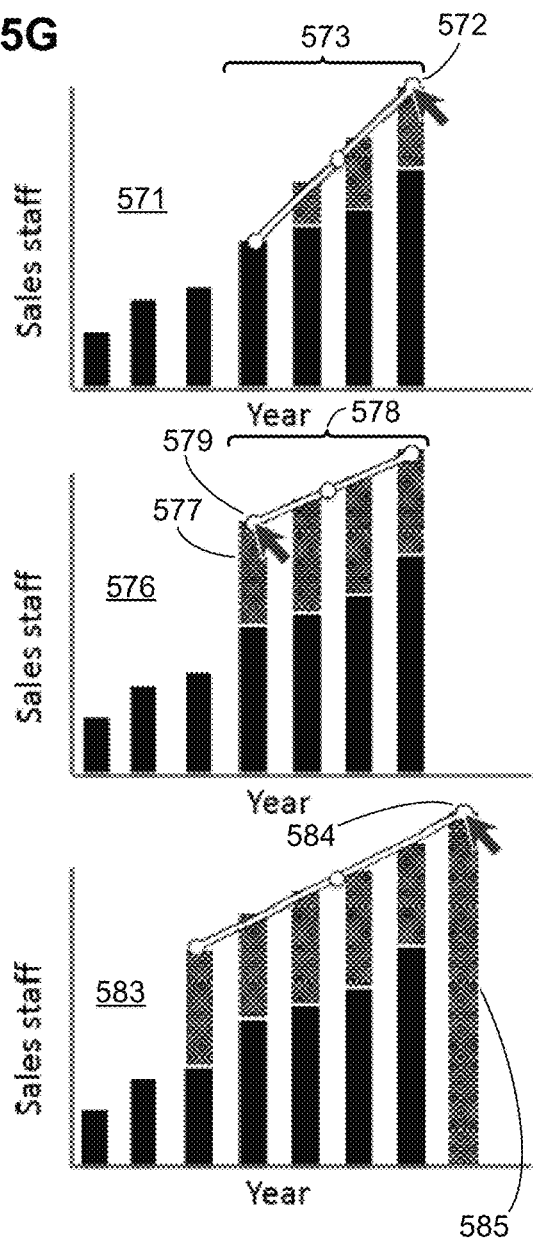

Users can also manipulate multiple inputs at once by selecting multiple marks, as illustrated in FIG. 5G. In some implementations, when multiple marks are selected, the data visualization application 222 creates an indicator bar 568 that can be used to manipulate the multiple marks as a group. Users can leverage the indicator bar 568 to override values by simulating different trends.

The examples in FIG. 5G show sales staff numbers being overridden using a linear model. In these examples, the x-axis starts at year 2008, so the user's selection includes the years 2011, 2012, 2013, and 2014. In the first data visualization 570, the user is simulating a trend going from the actual value observed in 2011 to a hypothetical value in 2014. Using this information, the data visualization application calculates the corresponding linear equation (slope and intercept) for the line being displayed and uses that to calculate the override values for the bars.

In the second data visualization 571, the user has moved the right endpoint 572 of the indicator bar 568 upwards, thus increasing the size of all the bars in the middle. The left end of the indicator bar is held fixed here, so the leftmost bar in the group 573 is unchanged. The shape of the indicator bar remains a line, but the slope changes.

In the third data visualization 574 in FIG. 5G, the user moves the indicator bar 568 vertically without changing the slope, so each of the bar data marks in the group 575 increases in height by the same amount.

In the fourth data visualization 576, the user moves the left endpoint 579 of the indicator bar 568 vertically, increasing the size of the leftmost extension 577 in the group 578.

The fifth data visualization 580 illustrates the user moving the left endpoint 582 of the indicator bar 568 horizontally, which expands the scope of data marks for which the override applies. In this case, a new extension 581 is created for the third bar of the bar graph (corresponding to the year 2010).

The sixth data visualization 583 illustrates extending the indicator bar beyond the bars currently displayed in the data visualization. This creates a new data mark 585, which corresponds to the next year in the sequence (2015) and has height corresponding to the rightmost point 584 of the indicator bar 568.

Because the indicator bar 568 extends between two values visually chosen by the user (e.g., growth from $100K in Sales in 2011 to $170K in 2015), the user doesn't have to think about equations or slopes. The user just needs to know the target Sales values.

Figure 5H:
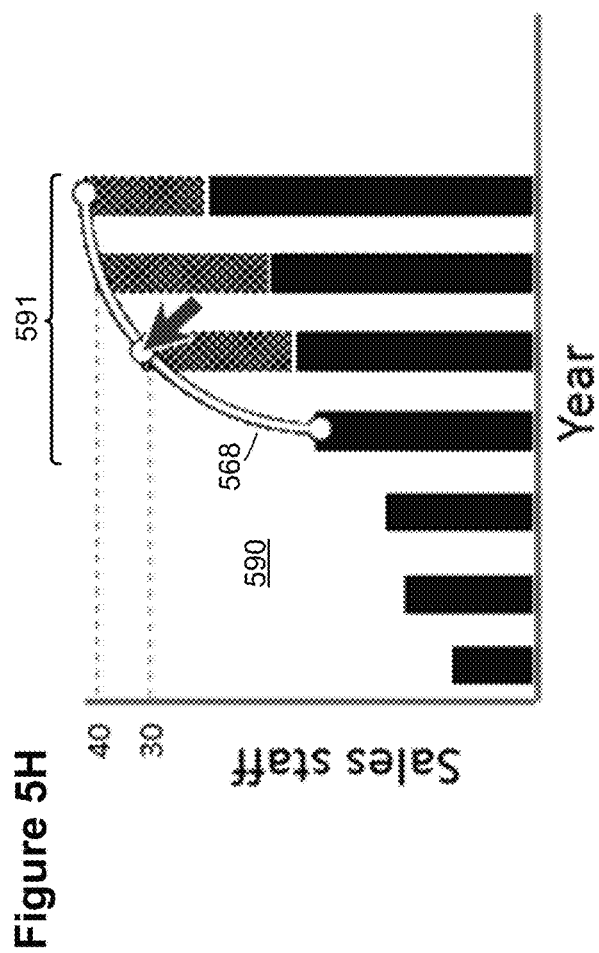
Figure 5H:
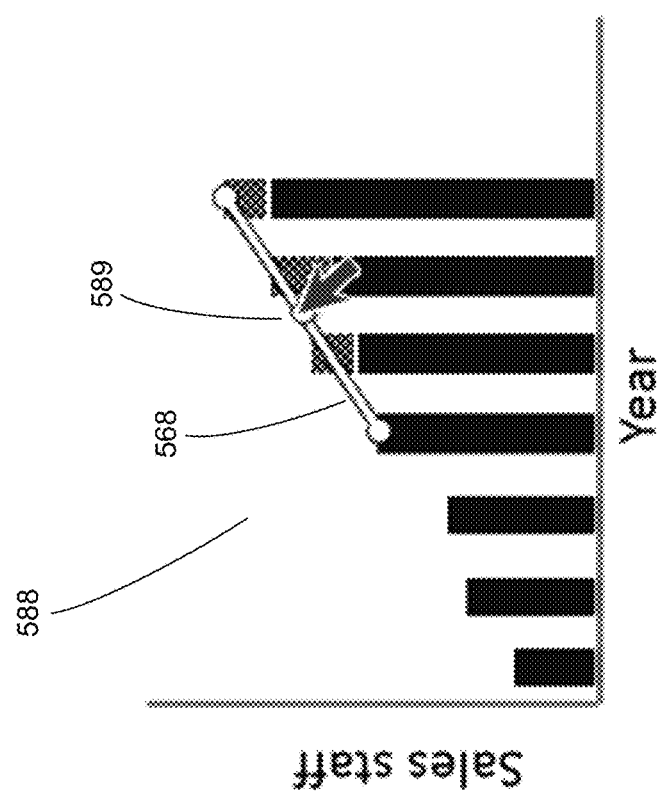

In some implementations, the shape of the indicator bar 568 can be changed, as illustrated in FIG. 5H. The indicator bar 568 allows the user to push and prod trends into a variety of curves, which are tracked internally using appropriate equations. This simplifies the mental model because it does not require the user to understand the parameters or functions used in the mathematical equations. In the example illustrated in FIG. 5H, the left data visualization 588 shows the user selecting the midpoint 589 of the indicator bar 568. In the right data visualization 590, the user has moved the midpoint 589 upward and to the left, creating a curved indicator bar 568. Each of the affected data marks in the group 591 is modified according to the modified shape of the indicator bar 568.

The description above for FIGS. 5A-5H has focused on propagating changes from an "input" data visualization to an "output" data visualization. However, in many cases, changes can be implemented bi-directionally. In some instances, there is no inherent "cause" and "effect." In many instances, even when there is a clear cause and effect, the functional model can be reversed. For example, a user can ask "to hit a revenue goal of X, how many sales staff should I have hired?"

Figure 5I:
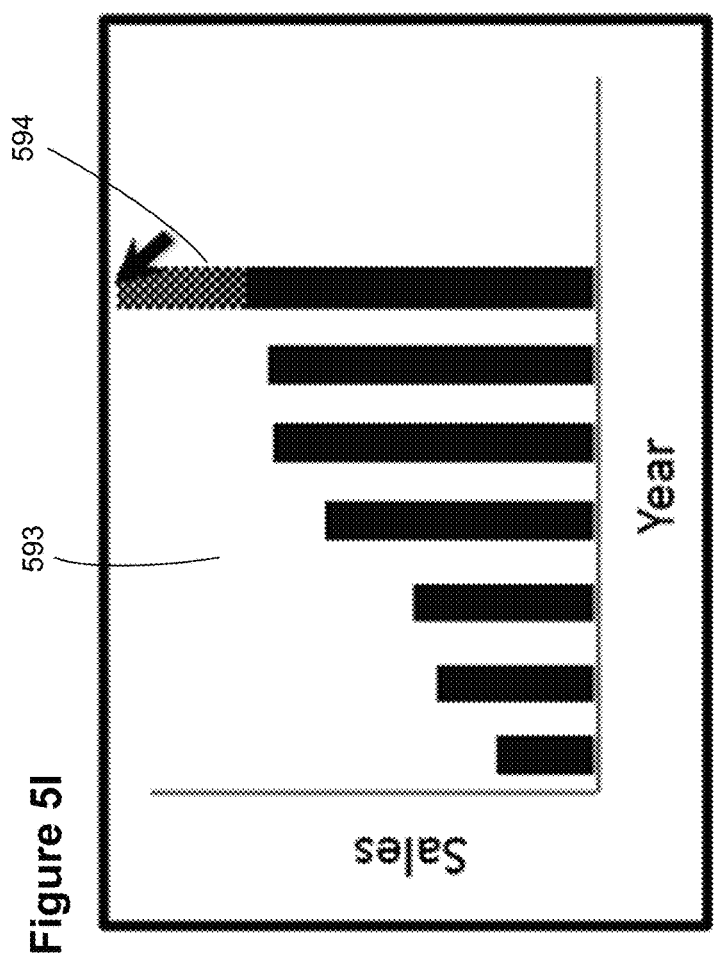
Figure 5I:
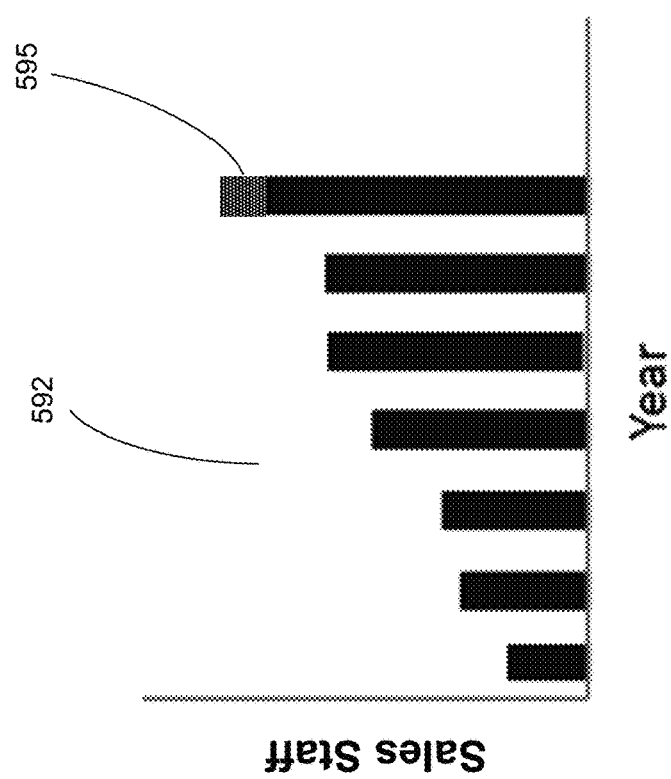

As illustrated in FIG. 5I, a user can answer this question by interacting with the Sales data visualization 593 (the "output data visualization"). If Sales is modeled with the formula [Sales]=10,000+20,000*[Sales Staff], the roles can be reversed using the formula [Sales Staff]=([Sales]−10,000)/20,000. In this way, the same techniques described above can be applied with the roles of the two data visualizations reversed. In fact a user can make a sequence of changes, with each change being to either one of the data visualizations, and the corresponding changes are applied to the other data visualization. Typically, the adjustments are displayed differently from the raw data in both of the data visualizations. As illustrated in FIG. 5I, the adjustment 594 is displayed visually in a different color or pattern, and the corresponding adjustment 595 to the "input" data visualization is also displayed in a visually distinctive way.

As illustrated in FIGS. 5F and 5G, user interaction with a data visualization can create new data marks. These new data marks create corresponding new data marks in the other data visualization. FIG. 5I illustrates that a user can interact with these newly created marks. For example, a user can interact with results of a model that adds new data marks in a time series forecast or an extrapolation from a linear equation.

Figure 5J:
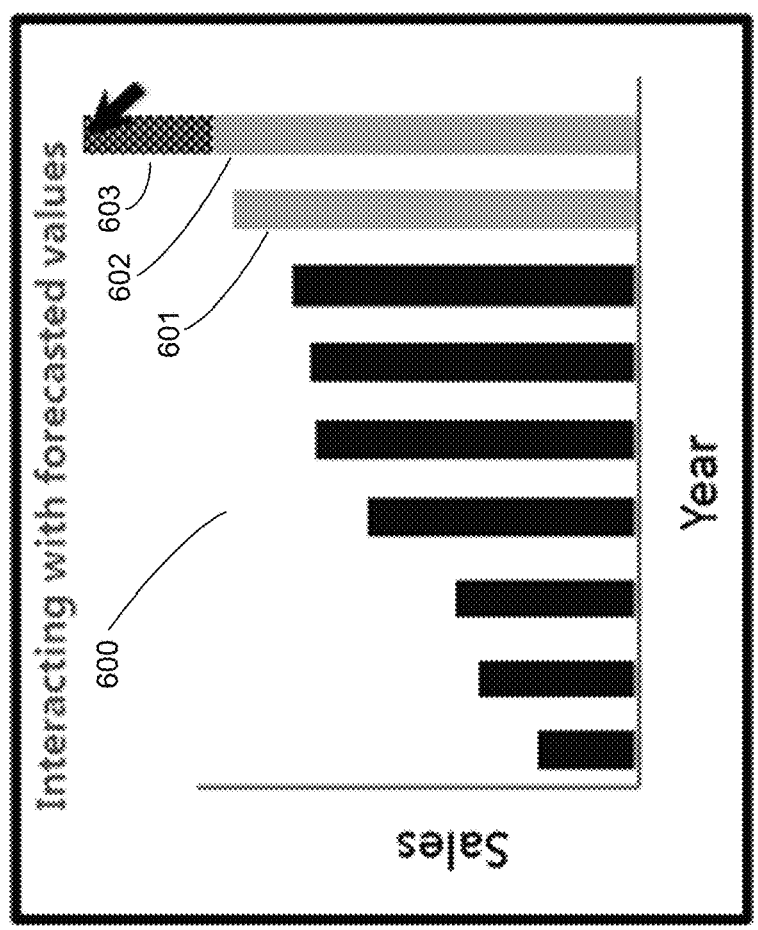
Figure 5J:
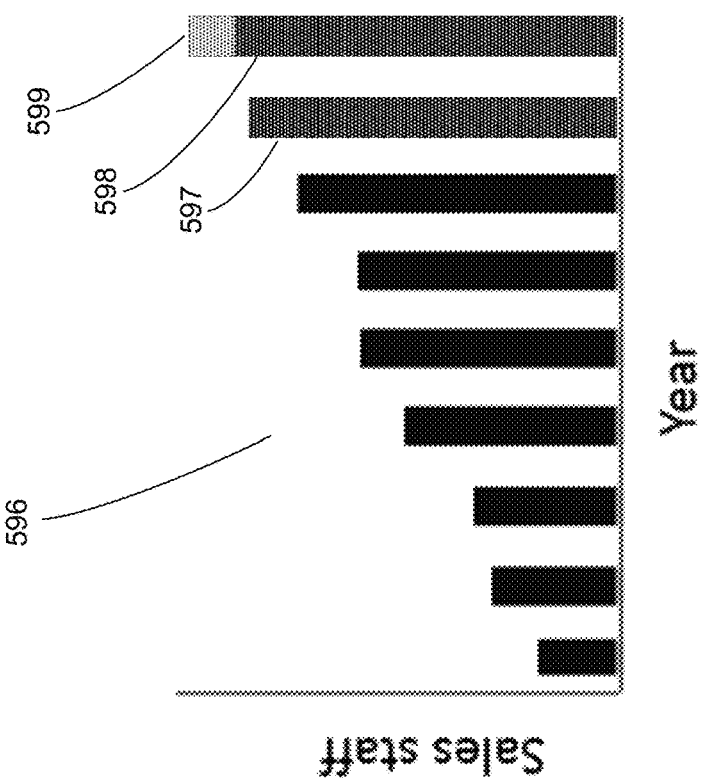
Figure 6B:
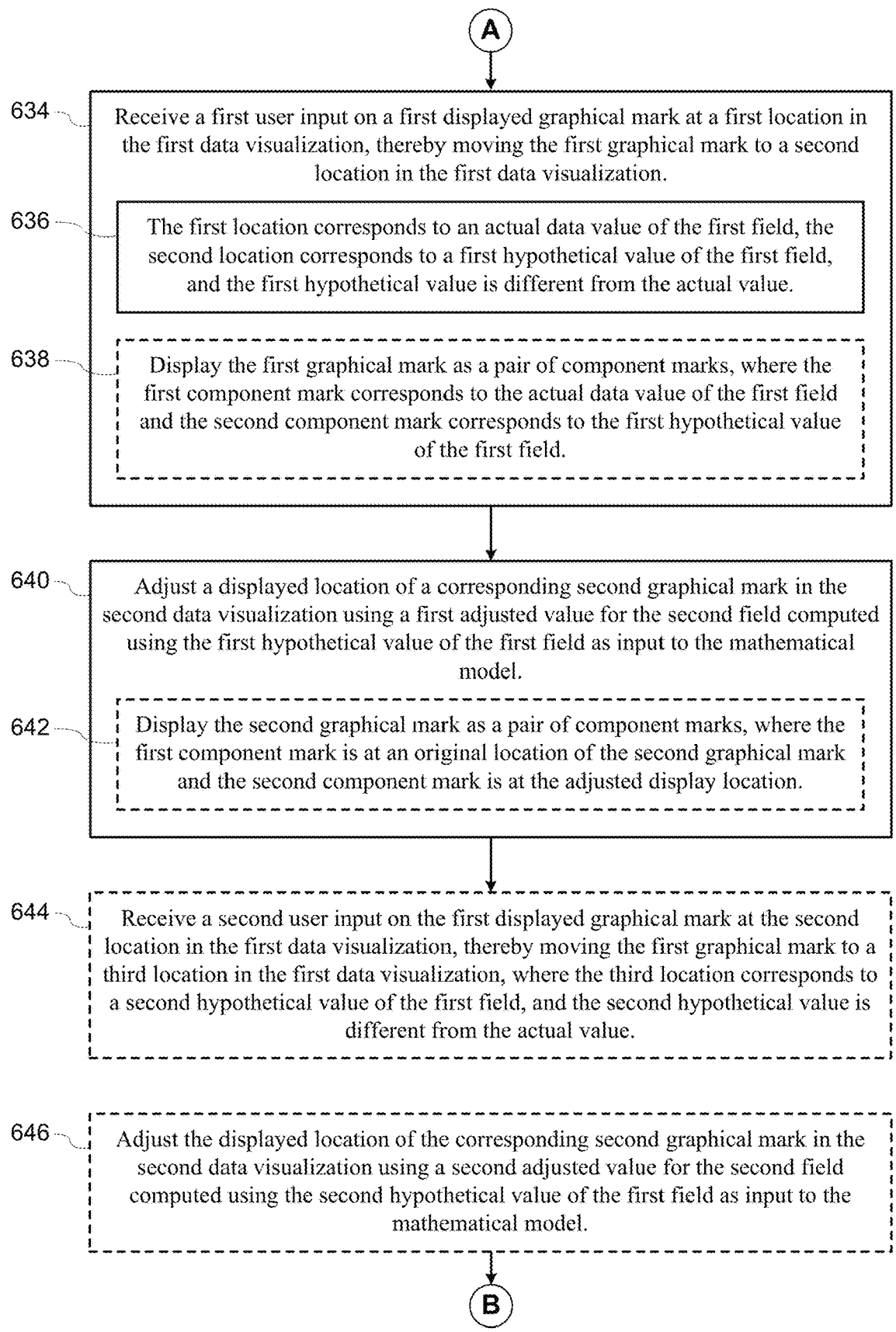
Figure 6C:
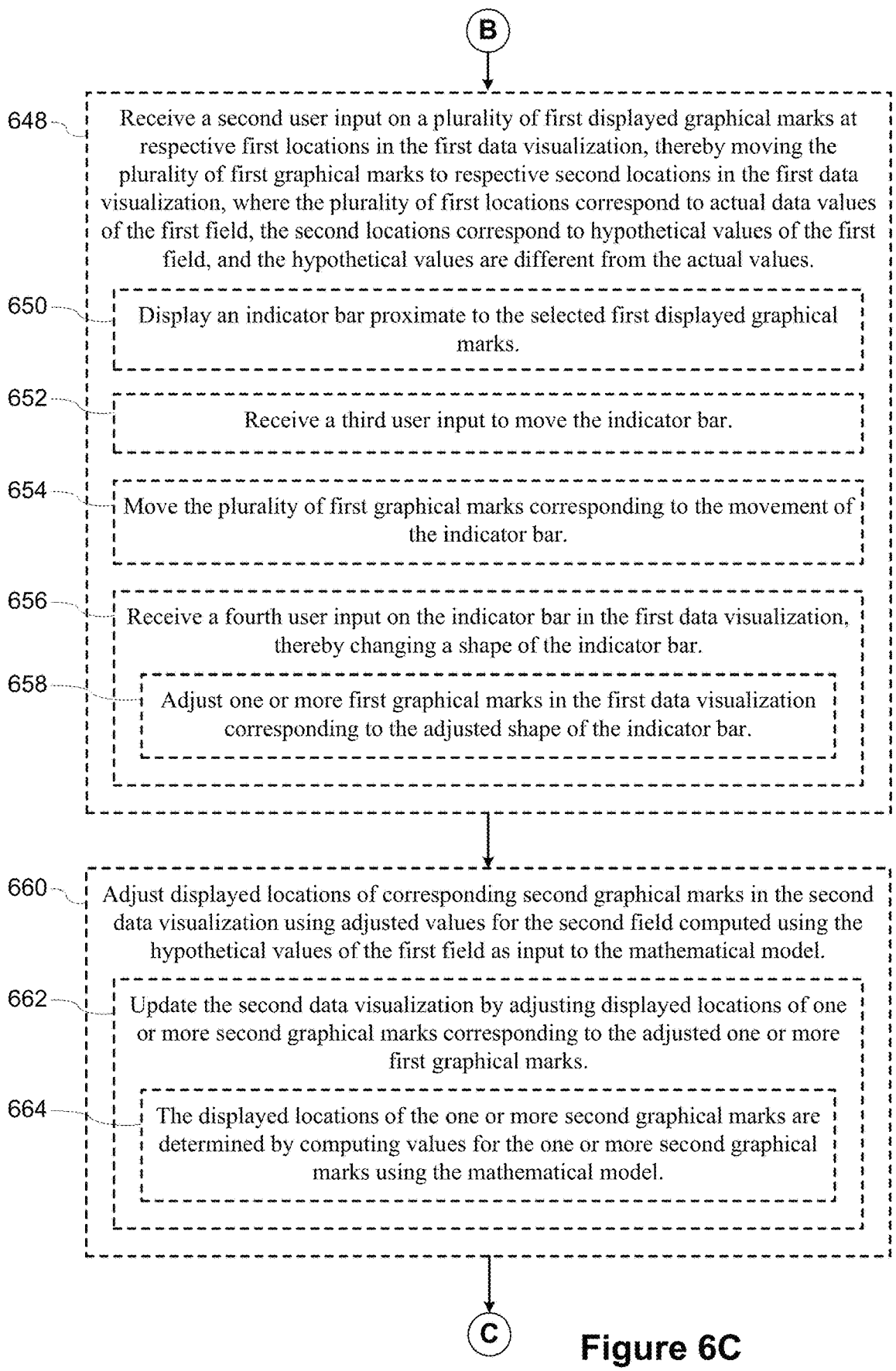
Figure 6D:
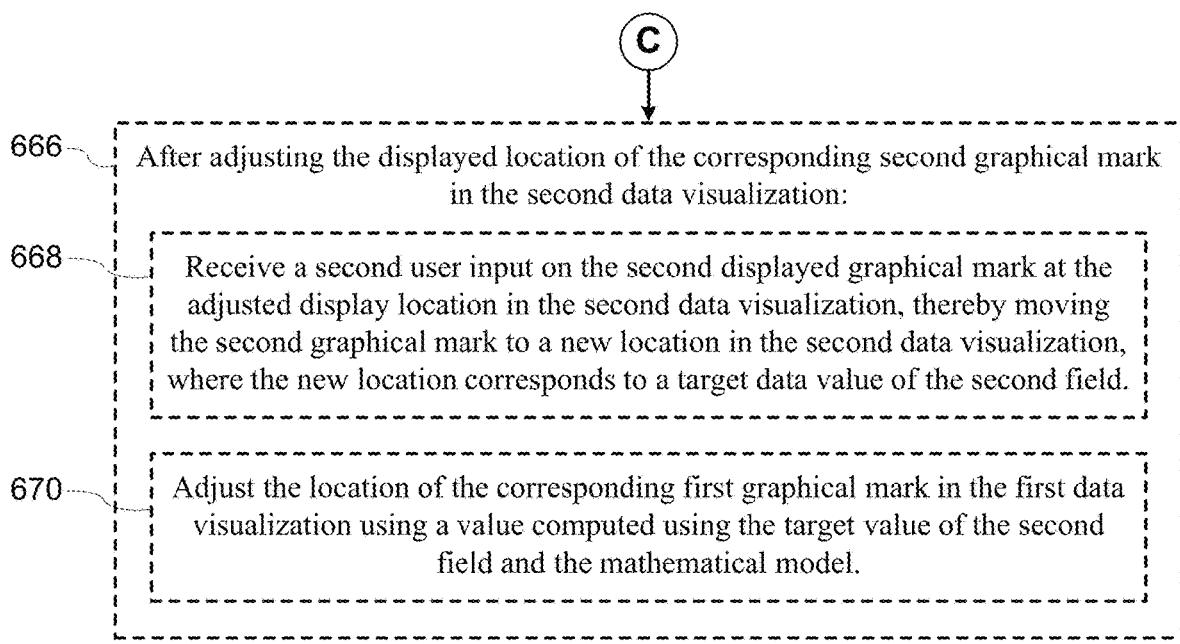

In the example in FIG. 5I, the user initially creates two additional data marks 597 and 598 in the left data visualization 596. The data visualization application 222 generates a forecast of sales for the next two years, including the two additional sales graphical marks 601 and 602 in the sales data visualization 600. The user realizes that forecast does not meet the company goals, so the user interacts with the sales visualization 600, adding the additional sales 603 based on the company goals. The user's interaction with the sales data visualization 600 generates an adjustment 599 in the sales staff needed to meet the adjusted sales target. This answers the question "to hit a revenue goal of X in 2016, how many sales people should I hire?" As FIG. 5J illustrates, a user can make any number of changes to either data visualization, and the changes are reflected in the other data visualization.

FIGS. 6A-6D provide a flowchart of a process 610 for visually analyzing (612) a dataset using linked interactive data visualizations according to some implementations. The linked data visualizations are typically part of a dashboard. The process is performed (614) at a computer having a display, one or more processors, and memory. The memory stores (616) one or more programs (e.g., a data visualization application 222) configured for execution by the one or more processors.

The application 222 displays (618) a first data visualization and a second data visualization concurrently on the display, as illustrated above in FIGS. 3A-3C, 4A-4J, and 5A-5D. The first data visualization is based on (620) a first plurality of data fields from a data source. For example, the left data visualization 502-A in FIG. 5A is based on a data field that tracks the number of sales staff members and a data field that tracks year. The second data visualization is based on (622) a second plurality of data fields from the data source. For example, the right data visualization 504-A in FIG. 5A is based on a data field that tracks sales and a data field that tracks year. In the example of FIG. 5A, the first plurality of data fields and the second plurality of data fields share (624) a time data field (Year), and the first and second data visualizations have (624) time axes corresponding to the time data field. The first and second data visualizations display (626) graphical marks representing values of the data fields in the first plurality and the second plurality. For example, in FIG. 5A the graphical marks are vertical bars in both the left data visualization 502-A and the right data visualization 504-A. In FIG. 5D, the graphical marks are points on a line chart in the left data visualization 530, but vertical bars in the right data visualization 532. In some implementations, the first data visualization and second data visualization have (628) view types selected from among: bar chart, line chart, scatter plot, and map.

The data visualization application 222 forms (630) a mathematical model to represent a functional relationship between a first field and a second field, where The first field is (632) in the first plurality of data fields, the second field is (632) in the second plurality of data fields, and the first field is (632) distinct from the second field. In some instances, the model is a linear model, as illustrated above with respect to FIGS. 5A-5J. In other instances, the model is exponential, quadratic, cubic, logarithmic, or another type of mathematical function. The model can be constructed using statistical methods, such as least squares, or other techniques for curve fitting.

The data visualization application 222 receives (634) a first user input on a first displayed graphical mark at a first location in the first data visualization, thereby moving the first graphical mark to a second location in the first data visualization. For example, FIG. 3B illustrates a first user input on the rightmost bar 322 at a point A, and then dragging to point B. As illustrated in this example from FIG. 3B, the first location (A) corresponds (636) to the actual data value of the first field (sales staff), the second location (B) corresponds (636) to a first hypothetical value of the first field, and the first hypothetical value is (636) different from the actual value. In some implementations, the first graphical mark is displayed (638) as a pair of component marks, where the first component mark corresponds to the actual data value of the first field and the second component mark corresponds to the first hypothetical value of the first field. This is illustrated in FIG. 3B, where the modified mark 326 is displayed as a combination of the original mark 322 plus the extension 324.

Based on the adjustment in the first data visualization, the data visualization application 222 adjusts (640) a displayed location of a corresponding second graphical mark in the second data visualization using a first adjusted value for the second field computed using the first hypothetical value of the first field as input to the mathematical model. This is illustrated in FIGS. 3B and 3C, where the area 342 shows a transition from a previous actual value to a new value computed based on the hypothetical value for sales staff. This is also illustrated in FIGS. 5A-5C, where the adjusted input values in the input data visualization 502-A result in modified data marks 508-B and 508-C in the output data visualizations 504-B and 504-C. In some implementations, the second graphical mark is displayed (642) as a pair of component marks, where the first component mark is at an original location of the second graphical mark and the second component mark is at the adjusted display location. This is similar to the display in FIG. 3B for the lower data visualization, but applied to the second (linked) data visualization.

User interaction with a data visualization is not limited to a single user modification. In some instances, the data visualization application 222 receives (644) a second user input on the first displayed graphical mark at the second location in the first data visualization, thereby moving the first graphical mark to a third location in the first data visualization, where the third location corresponds to a second hypothetical value of the first field, and the second hypothetical value is different from the actual value. For example, FIG. 5B illustrates a first user interaction to modify the rightmost bar 506-A of the input data visualization 502-B. Subsequently, the user modifies the value again in FIG. 5C. In response, the data visualization application 222 adjusts (646) the displayed location of the corresponding second graphical mark in the second data visualization using a second adjusted value for the second field computed using the second hypothetical value of the first field as input to the mathematical model. This is illustrated by the output data visualizations 504-B and 504-C in FIGS. 5B and 5C.

Some implementations enable a user to modify a group of data marks at the same time. In some implementations, this process uses an indicator bar, as illustrated in FIGS. 5G and 5H.

In some instances, the data visualization application 222 receives (648) a second user input on a plurality of first displayed graphical marks at respective first locations in the first data visualization, thereby moving the plurality of first graphical marks to respective second locations in the first data visualization, where the plurality of first locations correspond to actual data values of the first field, the second locations correspond to hypothetical values of the first field, and the hypothetical values are different from the actual values. This is illustrated by the six data visualizations 568, 571, 574, 576, 580, and 583 in FIG. 5G. In some implementations, the data visualization application 222 displays (650) an indicator bar 568 proximate to the selected first displayed graphical marks. The application 222 receives (652) a third user input to move the indicator bar, and moves (654) the plurality of first graphical marks corresponding to the movement of the indicator bar.

In some implementations, the application 222 receives (656) a fourth user input on the indicator bar 568 in the first data visualization, thereby changing a shape of the indicator bar, as illustrated in FIG. 5H. In response, the application 222 adjusts (658) one or more first graphical marks in the first data visualization corresponding to the adjusted shape of the indicator bar, such as the bars in the region 591 in the data visualization 590 in FIG. 5H. The displayed locations of corresponding second graphical marks in the second data visualization are adjusted (660) using adjusted values for the second field computed using the hypothetical values of the first field as input to the mathematical model. This is illustrated in FIGS. 4C-4F. This updates (662) the second data visualization by adjusting displayed locations of one or more second graphical marks corresponding to the adjusted one or more first graphical marks. The displayed locations of the one or more second graphical marks are determined (664) by computing values for the one or more second graphical marks using the mathematical model.

As illustrated with respect to FIG. 5J, the linking between data visualizations is typically bidirectional. In some instances, after adjusting (666) the displayed location of the corresponding second graphical mark in the second data visualization, the application 222 receives (668) a second user input on the second displayed graphical mark at the adjusted display location in the second data visualization, thereby moving the second graphical mark to a new location in the second data visualization, where the new location corresponds to a target data value of the second field. The application 222 then adjusts (670) the location of the corresponding first graphical mark in the first data visualization using a value computed using the target value of the second field and the mathematical model, as illustrated in FIG. 5J.

The disclosed implementations typically provide "instant" or "real-time" updates or feedback based on user actions. In practice, "instant" or "real-time" means within a short period of time and without additional user input. For example, the "instant" or "real-time" updates may occur within one twentieth of a second, one tenth of a second, one half of a second, or a second. As computer processors become more powerful, instant updates can occur more quickly and/or for even more complex operations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for dynamically analyzing data in a data visualization dashboard, comprising:
    at a computer having a display, one or more processors, and memory storing one or more programs configured for execution by the one or more processors:
        concurrently graphing a first data visualization and a second data visualization on the display, wherein:
            the first data visualization comprises a first plurality of graphical marks corresponding to a first plurality of data fields from a data source;
            the second data visualization comprises a second plurality of graphical marks corresponding to a second plurality of data fields from the data source; and
            the first plurality of data fields and the second plurality of data fields have a shared data field, which is visually represented using a same set of data values for the shared data field by both the first plurality of graphical marks and the second plurality of graphical marks;
        forming a mathematical model to represent a functional relationship between a first field and a second field, wherein the first field is in the first plurality of data fields, the second field is in the second plurality of data fields, and the first field, the second field, and the shared data field are all distinct;
        in response to receiving a first user input on a first graphical mark, of the first plurality of graphical marks, displayed at a first location in the first data visualization, updating the first data visualization and the second data visualization concurrently in real-time, the updating including:
            moving the first graphical mark from the first location corresponding to an actual data value of the first field to a second location in the first data visualization, thereby creating a first hypothetical value of the first field in the first data visualization, wherein the first hypothetical value is different from the actual data value and is not stored in the data source; and
            adjusting a displayed location of a corresponding second graphical mark of the second plurality of graphical marks, in the second data visualization, using a first adjusted value for the second field computed using the first hypothetical value of the first field as input to the mathematical model.

2. The method of claim 1, wherein the first data visualization and second data visualization have view types selected from the group consisting of bar chart, line chart, scatter plot, and map.

3. The method of claim 1, wherein the shared data field is a time data field, and the first data visualization and the second data visualization have time axes corresponding to the shared data field.

4. The method of claim 1, further comprising:
    in response to receiving a second user input on the first displayed graphical mark at the second location in the first data visualization, updating the first data visualization and the second data visualization concurrently in real-time, the updating including:
        moving the first graphical mark from the second location to a third location in the first data visualization, thereby creating a second hypothetical value of the first field in the first data visualization, wherein the second hypothetical value is different from the actual data value; and
        adjusting the displayed location of the corresponding second graphical mark in the second data visualization using a second adjusted value for the second field computed using the second hypothetical value of the first field as input to the mathematical model.

5. The method of claim 1, further comprising after receiving the first user input:
    displaying the first graphical mark as a pair of component marks, wherein the first component mark corresponds to the actual data value of the first field and the second component mark corresponds to the first hypothetical value of the first field.

6. The method of claim 1, further comprising:
    displaying the second graphical mark as a pair of component marks, wherein the first component mark is at an original location of the second graphical mark and the second component mark is at the adjusted display location.

7. The method of claim 1, further comprising:
in response to receiving a second user input on a plurality of first displayed graphical marks at respective first locations in the first data visualization, updating the first data visualization and the second data visualization concurrently in real-time, the updating including:
   moving the plurality of first graphical marks from the respective first locations corresponding to respective actual data values of the first field to respective second locations in the first data visualization, thereby creating respective hypothetical values of the first field in the first data visualization, wherein the hypothetical values are different from the actual data values; and
   adjusting displayed locations of corresponding second graphical marks in the second data visualization using adjusted values for the second field computed using the hypothetical values of the first field as input to the mathematical model.

8. The method of claim 7, wherein in response to receiving the second user input on the plurality of first displayed graphical marks at respective first locations in the first data visualization, updating the first data visualization and the second data visualization concurrently in real-time comprises:
   displaying an indicator bar proximate to the selected first displayed graphical marks; and
   in response to receiving a third user input to move the indicator bar, moving the plurality of first graphical marks corresponding to the movement of the indicator bar.

9. The method of claim 7, further comprising:
displaying an indicator bar proximate to the selected first displayed graphical marks;
in response to receiving a fourth user input on the indicator bar in the first data visualization, updating the first data visualization and the second data visualization concurrently in real-time, the updating including:
   changing a shape of the indicator bar;
   adjusting one or more first graphical marks in the first data visualization corresponding to the adjusted shape of the indicator bar; and
   updating the second data visualization by adjusting displayed locations of one or more second graphical marks corresponding to the adjusted one or more first graphical marks,
wherein the displayed locations of the one or more second graphical marks are determined by computing values for the one or more second graphical marks using the mathematical model.

10. The method of claim 1, further comprising:
after adjusting the displayed location of the corresponding second graphical mark in the second data visualization:
   in response to receiving a second user input on the second displayed graphical mark at the adjusted display location in the second data visualization, updating the first data visualization and the second data visualization concurrently in real-time, the updating including:
      moving the second graphical mark to a new location in the second data visualization, wherein the new location corresponds to a target data value of the second field; and
      adjusting the location of the corresponding first graphical mark in the first data visualization using a value computed using the target value of the second field and the mathematical model.

11. A computing device, comprising:
one or more processors;
memory;
a display; and
one or more programs stored in the memory and configured for execution by the one or more processors, the one or more programs comprising instructions for:
   concurrently graphing a first data visualization and a second data visualization on the display, wherein:
      the first data visualization comprises a first plurality of graphical marks corresponding to a first plurality of data fields from a data source;
      the second data visualization comprises a second plurality of graphical marks corresponding to a second plurality of data fields from the data source; and
      the first plurality of data fields and the second plurality of data fields have a shared data field, which is visually represented using a same set of data values for the shared data field by both the first plurality of graphical marks and the second plurality of graphical marks;
   forming a mathematical model to represent a functional relationship between a first field and a second field, wherein the first field is in the first plurality of data fields, the second field is in the second plurality of data fields, and the first field, the second field, and the shared data field are all distinct;
   in response to receiving a first user input on a first graphical mark, of the first plurality of graphical marks, displayed at a first location in the first data visualization, updating the first data visualization and the second data visualization concurrently in real-time, the updating including:
      moving the first graphical mark from the first location corresponding to an actual data value of the first field to a second location in the first data visualization, thereby creating a first hypothetical value of the first field in the first data visualization, wherein the first hypothetical value is different from the actual data value and is not stored in the data source; and
      adjusting a displayed location of a corresponding second graphical mark of the second plurality of graphical marks, in the second data visualization, using a first adjusted value for the second field computed using the first hypothetical value of the first field as input to the mathematical model.

12. The computing device of claim 11, wherein the first plurality of data fields and the second plurality of data fields share a time data field, which is distinct from the first and second fields, and the first data visualization and the second data visualization have time axes corresponding to the time data field.

13. The computing device of claim 11, wherein the one or more programs further comprise instructions for:
in response to receiving a second user input on the first displayed graphical mark at the second location in the first data visualization, updating the first data visualization and the second data visualization concurrently in real-time, the updating including:
   moving the first graphical mark from the second location to a third location in the first data visualization, thereby creating a second hypothetical value of the first field in the first data visualization, wherein the second hypothetical value is different from the actual data value; and adjusting the displayed location of the corresponding second graphical mark in the second data visualization using a second adjusted value for the second field computed using the second hypothetical value of the first field as input to the mathematical model.

14. The computing device of claim 11, wherein the one or more programs further comprise instructions for:

after receiving the first user input:

displaying the first graphical mark as a pair of component marks, wherein the first component mark corresponds to the actual data value of the first field and the second component mark corresponds to the first hypothetical value of the first field.

15. The computing device of claim 11, wherein the one or more programs further comprise instructions for:

displaying the second graphical mark as a pair of component marks, wherein the first component mark is at an original location of the second graphical mark and the second component mark is at the adjusted display location.

16. The computing device of claim 11, wherein the one or more programs further comprise instructions for:

in response to receiving a second user input on a plurality of first displayed graphical marks at respective first locations in the first data visualization, updating the first data visualization and the second data visualization concurrently in real-time, the updating including:

moving the plurality of first graphical marks from the respective first locations corresponding to respective actual data values of the first field to respective second locations in the first data visualization, thereby creating respective hypothetical values of the first field in the first data visualization, wherein the hypothetical values are different from the actual data values; and adjusting displayed locations of corresponding second graphical marks in the second data visualization using adjusted values for the second field computed using the hypothetical values of the first field as input to the mathematical model.

17. The computing device of claim 16, wherein in response to receiving the second user input on the plurality of first displayed graphical marks at respective first locations in the first data visualization, updating the first data visualization and the second data visualization concurrently in real-time comprises:

displaying an indicator bar proximate to the selected first displayed graphical marks; and in response to receiving a third user input to move the indicator bar, moving the plurality of first graphical marks corresponding to the movement of the indicator bar.

18. The computing device of claim 16, wherein the one or more programs further comprise instructions for:

displaying an indicator bar proximate to the selected first displayed graphical marks;

in response to receiving a fourth user input on the indicator bar in the first data visualization, updating the first data visualization and the second data visualization concurrently in real-time, the updating including:

changing a shape of the indicator bar;

adjusting one or more first graphical marks in the first data visualization corresponding to the adjusted shape of the indicator bar; and updating the second data visualization by adjusting displayed locations of one or more second graphical marks corresponding to the adjusted one or more first graphical marks, wherein the displayed locations of the one or more second graphical marks are determined by computing values for the one or more second graphical marks using the mathematical model.

19. The computing device of claim 11, wherein the one or more programs further comprise instructions for:

after adjusting the displayed location of the corresponding second graphical mark in the second data visualization:

in response to receiving a second user input on the second displayed graphical mark at the adjusted display location in the second data visualization, updating the first data visualization and the second data visualization concurrently in real-time, the updating including:

moving the second graphical mark to a new location in the second data visualization, wherein the new location corresponds to a target data value of the second field; and adjusting the location of the corresponding first graphical mark in the first data visualization using a value computed using the target value of the second field and the mathematical model.

20. A non-transitory computer readable storage medium storing one or more programs configured for execution by a computing device having one or more processors, memory, and a display, the one or more programs comprising instructions for:

concurrently graphing a first data visualization and a second data visualization on the display, wherein:

the first data visualization comprises a first plurality of graphical marks corresponding to a first plurality of data fields from a data source;

the second data visualization comprises a second plurality of graphical marks corresponding to a second plurality of data fields from the data source; and the first plurality of data fields and the second plurality of data fields have a shared data field, which is visually represented using a same set of data values for the shared data field by both the first plurality of graphical marks and the second plurality of graphical marks;

forming a mathematical model to represent a functional relationship between a first field and a second field, wherein the first field is in the first plurality of data fields, the second field is in the second plurality of data fields, and the first field, the second field, and the shared data field are all distinct;

in response to receiving a first user input on a first graphical mark, of the first plurality of graphical marks, displayed at a first location in the first data visualization, updating the first data visualization and the second data visualization concurrently in real-time, the updating including:

moving the first graphical mark from the first location corresponding to an actual data value of the first field to a second location in the first data visualization, thereby creating a first hypothetical value of the first field in the first data visualization, wherein the first hypothetical value is different from the actual data value and is not stored in the data source; and adjusting a displayed location of a corresponding second graphical mark of the second plurality of graphical marks, in the second data visualization, using a first adjusted value for the second field computed using the first hypothetical value of the first field as input to the mathematical model.

\* \* \* \* \*